United States Patent
Namba et al.

[11] Patent Number: 6,071,672
[45] Date of Patent: *Jun. 6, 2000

[54] PHOTO-STABILIZED CYANINE DYES AND OPTICAL RECORDING MEDIA

[75] Inventors: Kenryo Namba, Tokyo; Sumiko Kitagawa, Saitama; Masahiro Shinkai, Chiba; Michio Suzuki, Hyogo; Satoshi Kimura, Hyogo; Kazuyoshi Hirako, Hyogo, all of Japan

[73] Assignees: TDK Corporation, Tokyo; Sumitomo Seika Chemicals Co., Ltd., Kako-gun, both of Japan

[*] Notice: This patent is subject to a terminal disclaimer.

[21] Appl. No.: 09/169,009

[22] Filed: Oct. 9, 1998

Related U.S. Application Data

[63] Continuation of application No. PCT/JP98/00391, Jan. 30, 1998.

[30] Foreign Application Priority Data

Feb. 10, 1997 [JP] Japan .................................. 9-041666

[51] Int. Cl.$^7$ ...................................................... G11B 7/24
[52] U.S. Cl. ................................. 430/270.18; 430/270.21; 430/270.2; 430/945; 549/3
[58] Field of Search ............................... 430/270.16, 945, 430/270.21, 270.2; 549/3; 544/109, 145; 546/187

[56] References Cited

U.S. PATENT DOCUMENTS

| | | | |
|---|---|---|---|
| 4,626,496 | 12/1986 | Sato et al. | 430/270.19 |
| 5,219,707 | 6/1993 | Namba | 430/270.21 |
| 5,856,520 | 1/1999 | Hirako et al. | 549/3 |

FOREIGN PATENT DOCUMENTS

| | | |
|---|---|---|
| 0 147 083 | 7/1985 | European Pat. Off. . |
| 1-19355 | 4/1989 | Japan . |
| 1-34464 | 7/1989 | Japan . |
| 1-34465 | 7/1989 | Japan . |
| 9-309886 | 12/1997 | Japan . |
| 10-45767 | 2/1998 | Japan . |
| WO 97-34903 | 9/1997 | WIPO . |

*Primary Examiner*—Martin Angebranndt
*Attorney, Agent, or Firm*—Oblon, Spivak, McClelland, Maier & Neustadt, P.C.

[57] ABSTRACT

The cyanine dyes of the invention are well soluble in solvents having a high evaporation rate and stable against light, and thus effective for improving productivity and realizing optical recording media, especially CD-R and DVD-R optical discs, having improved light resistance.

The optical recording medium of the invention uses a photo-stabilized cyanine dye which is obtained as a counter ion bonded compound between an anion of the formula (1) and a cation of the formula (2):

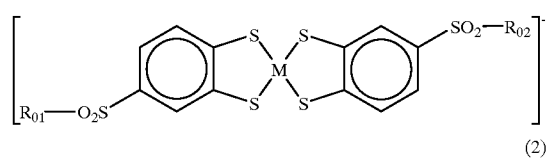

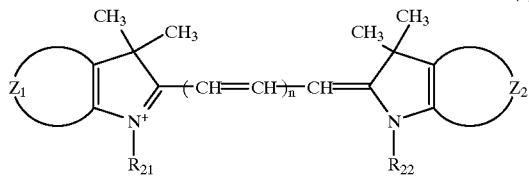

wherein $R_{01}$ and $R_{02}$ each are

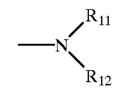

wherein each of $R_{11}$ and $R_{12}$ is an alkyl group of 1 to 4 carbon atoms or phenyl group,

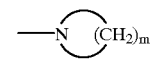

wherein m is equal to 3, 4, 5 or 6,

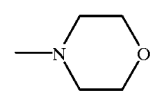

or phenyl groups; M is a transition metal; each of $Z_1$ and $Z_2$ is a fused benzene ring or fused naphthalene ring; each of $R_{21}$ and $R_{22}$ is an alkyl group; and n is equal to 0, 1 or 2.

12 Claims, No Drawings

PHOTO-STABILIZED CYANINE DYES AND OPTICAL RECORDING MEDIA

This application is a continuation application of PCT/JP98/00391, filed on Jan. 30, 1998.

BACKGROUND OF THE INVENTION

1. Field of the Invention

This invention relates to a photo-stabilized cyanine dye and an optical recording medium having a dye film as a recording layer. More particularly, it relates to a photo-stabilized cyanine dye which allows a dye coating step of a disc manufacturing process to use a solvent having a high evaporation rate, and a write-once type optical recording medium, especially optical disc, using the same.

2. Description of the Background

In recent years, various optical recording discs of the write-once, rewritable and other types are used in plenty as high capacity information carrying media. Among the optical recording discs, there are known those having a dye film composed mainly of a dye as the recording layer. From a structural aspect, optical recording discs proposed thus far include discs of the air-sandwich structure having an air space on a dye film and discs (CD-R) having a reflective layer of gold or the like disposed in close contact with a recording layer made of a dye film for providing a higher reflectance which can be read in accordance with the compact disc (CD) standard. (See Nikkei Electronics, Jan. 23, 1989, No. 465, page 107; the Functional Dye Department of the Kinki Chemical Society, Mar. 3, 1989, Osaka Science & Technology Center; and Proceedings SPIE—The International Society for Optical Engineering, Vol. 1078, pages 80–87, "Optical Data Storage Topical Meeting", 17–19, January 1989, Los Angels.) The demand for CD-R is dramatically increasing in these years. Since the quantity of CD-R consumed is increasing as rapidly as the supply is not equal to the demand, the productivity as to how many products can be supplied within a short time becomes an important task.

The demand for higher density recording is also increasing, which requires to reduce the wavelength of recording lasers. The digital video discs (DVD) complying with a laser having a wavelength of about 635 nm, on which efforts have been made for standardization as the next generation recording medium, are now on the verge of commercial products. The development of DVD-R using dyes for single recording use is also in progress. The dyes used therein must also be compatible with shorter wavelengths.

In the above-described discs, recording layers are generally formed by applying a coating dye solution.

When it is desired that such recording layers comply with CD-R and DVD-R, the use of cyanine dyes as the dyes for recording is preferred because they have optical advantages including easy alternation of wavelength and a greater index of refraction. On the other hand, the cyanine dyes have the drawback of lacking stability against light. Phthalocyanine dyes are well stable against light although it is difficult to use them in DVD-R because they cannot be tailored for shorter wavelength.

For the stabilization of cyanine dyes, the inventors found that salt forming dyes (ionic bond compound) between a benzenedithiol metal complex anion which is a singlet oxygen quencher and a cyanine dye cation are significantly stable against light, improved in light fastness and reduced in deterioration by reading (Japanese Patent No. 1551668 etc.), and succeeded in practical use thereof.

However, cyclohexanone which is a suitable solvent for dissolving the salt forming dye cannot be used because it attacks polycarbonate substrates. Accordingly, solvents having a fairly low drying rate such as diacetone alcohol must be used. Owing to the slow drying rate of solvents, a longer coating time is required per optical disc, becoming an obstruction against productivity improvement. Although cyanine dyes themselves are soluble, for example, in TFP (2,2,3,3-tetrafluoropropanol) at relatively high concentrations, most salt forming dyes substantially lose solubility. Even when dissolvable, they often fail to reach concentrations sufficient to provide a necessary film thickness.

Furthermore, the ionic bond compounds of cyanine dyes using conventional quencher anions have the problem that their effect on trimethine and monomethine cyanine dyes for the short wavelength is inferior to their effect on conventional heptamethine cyanine and pentamethine cyanine dyes for the long wavelength.

DISCLOSURE OF THE INVENTION

A primary object of the invention is to provide a light absorbing dye, specifically cyanine dye, which is well soluble in solvents having a high evaporation rate and stable against light and especially suited for optical discs such as CD-R and DVD-R.

A second object of the invention is to provide an optical recording medium which uses such a dye and is improved in productivity and light resistance, more particularly, an optical disc such as CD-R and DVD-R.

The above and other objects are achieved by the present invention which is defined below as (1) to (5).

(1) A photo-stabilized cyanine dye comprised of a counter ion bonded compound between a substituted benzenedithiol metal complex anion of the following formula (1) and a cyanine dye cation of the following formula (2):

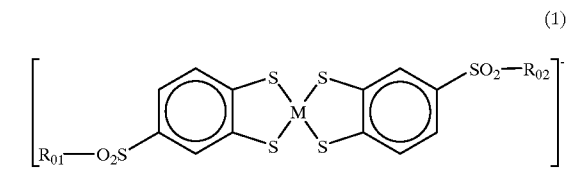

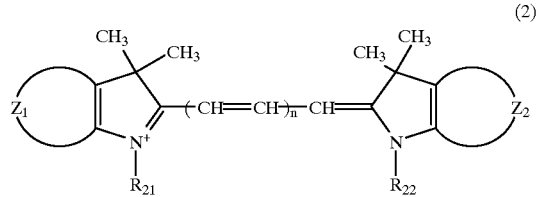

wherein $R_{01}$ and $R_{02}$ each are

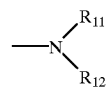

wherein each of $R_{11}$ and $R_{12}$ is an alkyl group of 1 to 4 carbon atoms or phenyl group,

wherein m is equal to 3, 4, 5 or 6,

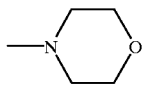

or phenyl groups,

M is a transition metal, each of $Z_1$ and $Z_2$ is a fused benzene ring or fused naphthalene ring, each of $R_{21}$ and $R_{22}$ is an alkyl group, and n is equal to 0, 1 or 2.

(2) An optical recording medium comprising a recording layer containing a cyanine dye having as a counter ion a substituted benzenedithiol metal complex anion of the following formula (1):

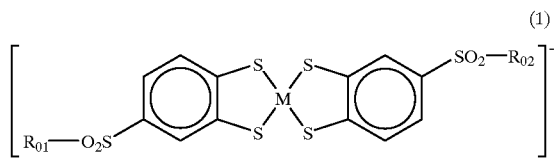

wherein $R_{01}$ and $R_{02}$ each are

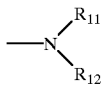

wherein each of $R_{11}$ and $R_{12}$ is an alkyl group of 1 to 4 carbon atoms or phenyl group,

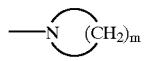

wherein m is equal to 3, 4, 5 or 6,

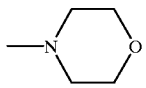

or phenyl groups, and

M is a transition metal.

(3) The optical recording medium of above (2) comprising a substrate having the recording layer thereon, wherein the cyanine dye contained in the recording layer is a dye comprised of a salt between a substituted benzenedithiol metal complex anion of formula (1) and a cyanine dye cation of the following formula (3):

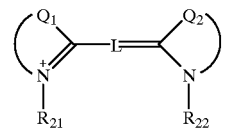

wherein each of $Q_1$ and $Q_2$ is a group of atoms for forming a 5-membered nitrogenous heterocyclic ring which may have a fused ring, each of $R_{21}$ and $R_{22}$ is an alkyl group, and L is a methine chain for completing the cyanine dye.

(4) The optical recording medium of above (2) or (3) wherein said recording layer has been formed by coating a solution using a solvent having a vapor pressure of at least 5.3 Torr at 25° C.

(5) The optical recording medium of any one of above (2) to (4) wherein said recording layer further contains at least one other dye.

FUNCTION AND EFFECT

According to the invention, the optical recording medium has in its recording layer a photo-stabilized cyanine dye comprised of a ionic bond compound between a substituted benzenedithiol metal complex anion of the above formula (1) and a cyanine dye cation.

The benzenedithiol metal complex is known as a singlet oxygen quencher. By attaching —SO$_2$R (wherein R is as defined for $R_{01}$ and $R_{02}$ in formula (1)) as the ligand to the benzene ring of the benzenedithiol at the predetermined position, the cyanine dye is significantly improved in light resistance and prevented from fading. Due to the effect of a substituent such as a sulfamoyl, nitrogenous heterocyclic sulfonyl or benzenesulfonyl, the solubility in solvents having a high evaporation rate such as TFP (2,2,3,3-tetrafluoropropanol) becomes very high, and the coating time as by spin coating is half reduced, leading to an improvement in productivity. Further, since the dye moiety playing an important role of governing optical constants is a cyanine dye, the degree of freedom of design is very high and the restrictions on the available wavelength band as imposed with phthalocyanine dyes are almost eliminated. The cyanine dyes having a substituted benzenedithiol metal complex anion of the above formula (1) as a counter ion and a cyanine dye cation of the above formula (2) are novel compounds.

It is noted that JP-A 118748/1985 (Japanese Patent No. 1551667), JP-A 118749/1985 (Japanese Patent No. 1551668) and JP-A 203488/1985 (Japanese Patent No. 1717195) that one of the inventors filed disclose salt forming dyes and optical recording media and describe that a significant improvement in light resistance is achievable using these salt forming dyes. However, these dyes are insufficient in coating time owing to the evaporation rate of solvents and also insufficient in durability and deterioration by reading in the short wavelength region.

Furthermore, Japanese Patent Application Kokai Nos. 309886/1997 and 45767/1998 describe the method for preparing the aforementioned substituted benzenedithiol metal complexes and also describe an improvement in light resistance of cyanine dyes. However, the salt formation of cyanine dyes using these benzenedithiol metal complexes is referred to nowhere. Also, since some of these benzenedithiol metal complexes have a melting point near room temperature when they have certain substituents, a recording layer of a mix system containing this complex and a cyanine dye has outstanding problems with respect to stability, for example, deformation of pits is expected.

BEST MODE FOR CARRYING OUT THE INVENTION

Several embodiments of the invention are described below in detail.

The photo-stabilized cyanine dye of the invention has a substituted benzenedithiol metal complex anion of the following formula (1) as a counter ion and a cyanine dye cation of formula (2). It is noted that formula (2) will be described later because it is the same as the preferred cyanine dye cation constructing the photo-stabilized cyanine dye used in the optical recording medium of the invention.

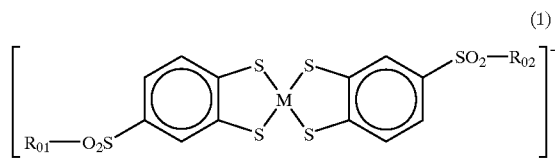
(1)

In the formula, $R_{01}$ and $R_{02}$ each are

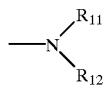

wherein each of $R_{11}$ and $R_{12}$ is an alkyl group of 1 to 4 carbon atoms or phenyl group,

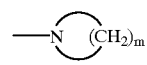

wherein m is equal to 3, 4, 5 or 6,

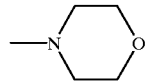

or phenyl groups; and M is a transition metal.

Herein, $R_{01}$ and $R_{02}$ represent dialkylamino groups. The alkyl groups (represented by $R_{11}$ and $R_{12}$) attached to the dialkylamino groups are substituted or unsubstituted, normal or branched alkyl groups having 1 to 4 carbon atoms in total. For example, unsubstituted alkyl groups such as methyl, ethyl, propyl and butyl are preferred. $R_{11}$ and $R_{12}$ may also be phenyl groups which may have attached thereto halogen atoms or alkyl groups of 1 to 4 carbon atoms. Besides the dialkylamino groups, $R_{01}$ and $R_{02}$ may be 4- to 7-membered, especially 6-membered (m=5) imino rings, cyclic imino groups derived from morpholino rings, or morpholino groups. Further, $R_{01}$ and $R_{02}$ may be phenyl groups. The phenyl groups may be unsubstituted ones or substituted ones having alkyl groups of 1 to 4 carbon atoms or halogen atoms.

In formula (1), M is a transition metal element. The transition metal element is not critical, and mention may be made of Fe, Co, Ni, Cu, and Pt, for example. Of these, Cu, Fe, Co and Ni are preferred, with Cu being most preferred.

Preferred illustrative examples of the substituted benzenedithiol metal complex anion of the above formula (1) are designated Q1 through Q20 in the following Table 1. Herein, they are represented by a combination of $R_{01}$, $R_{02}$ and M in formula (1).

TABLE 1

| Metal complex anion | $R_{01}$, $R_{02}$ | M |
|---|---|---|
| Q1 | —N(C$_2$H$_5$)$_2$ | Cu |
| Q2 | —N(CH$_3$)$_2$ | Cu |
| Q3 | piperidino | Cu |
| Q4 | phenyl | Cu |
| Q5 | —N(C$_3$H$_7$)$_2$ | Cu |
| Q6 | 2-methylphenyl | Cu |
| Q7 | 2-chlorophenyl | Cu |

TABLE 1-continued
| Metal complex anion | $R_{01}, R_{02}$ | M |
|---|---|---|
| Q8 | 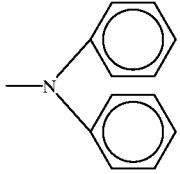 | Cu |
| Q9 | 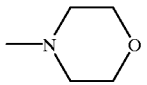 | Cu |
| Q10 | —N(C$_2$H$_5$)$_2$ | Ni |
| Q11 | 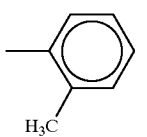 | Ni |
| Q12 | 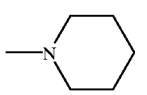 | Ni |
| Q13 | —N(C$_4$H$_9$)$_2$ | Cu |
| Q14 | 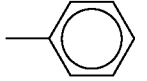 | Ni |
| Q15 | 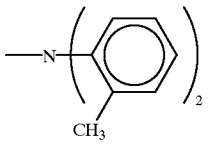 | Cu |
| Q16 | 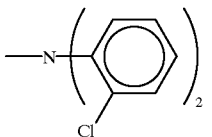 | Cu |
| Q17 | 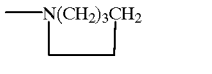 | Cu |
| Q18 | —N(CH$_3$)$_2$ | Fe |
| Q19 | 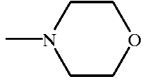 | Co |
| Q20 | 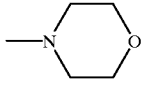 | Ni |

TABLE 1-continued

| Metal complex anion | $R_{O1}$, $R_{O2}$ | M |
|---|---|---|

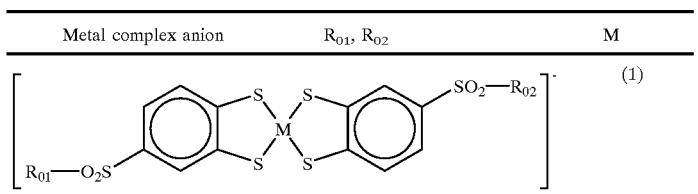
(1)

Described below is the method for preparing the substituted benzenedithiol metal complex anion of the above formula (1). The metal complex anion is obtained as an ion bonded compound with a quaternary ammonium salt. A complex having the substituted benzenedithiol metal complex anion of formula (1) can be synthesized by starting with 1,2-dibromobenzene and synthesizing an intermediate therefrom. The preparation method is described below step by step.

Step 1

This step is to synthesize 3,4-dibromobenzenesulfonic acid by reacting 1,2-dibromobenzene with fuming sulfuric acid in a solvent.

The amount of fuming sulfuric acid used herein, calculated as $SO_3$, is preferably set to 1.0 to 2.0 mol and more preferably 1.1 to 1.5 mol, per mol of 1,2-dibromobenzene. The solvent used in this reaction is preferably selected from halogenated hydrocarbon solvents such as chloroform, carbon tetrachloride and 1,2-ethylene dichloride.

During the reaction, the temperature is preferably set in a range of 50 to 100° C. and more preferably 65 to 80° C. The reaction time is generally 1 to 4 hours although optimum conditions vary with the reaction temperature.

Step 2

This step is to synthesize 3,4-dibromobenzenesulfonyl chloride by reacting the 3,4-dibromobenzenesulfonic acid obtained in Step 1 with thionyl chloride. The amount of thionyl chloride used herein is usually 1.0 to 2.5 mol and preferably 1.5 to 2.2 mol per mol of 3,4-dibromobenzenesulfonic acid.

In the reaction of this step, halogenated hydrocarbon solvents such as chloroform, carbon tetrachloride and 1,2-ethylene dichloride and aromatic hydrocarbon solvents such as benzene are preferably used as in Step 1. If the same solvent as in Step 1 is used in Step 2, Steps 1 and 2 can be continuously carried out, which is advantageous from the standpoints of operating efficiency and yield. Also the reaction temperature is preferably set in a range of 50 to 100° C. and more preferably 65 to 80° C. The reaction time is generally 1 to 4 hours although optimum conditions vary with the reaction temperature.

Step 3

This step is to synthesize a 4-substituted sulfonyl-1,2-dibromobenzene (or substituted dibromobenzene compound) by reacting the 3,4-dibromobenzenesulfonyl chloride obtained in Step 2 with a diamine of the following formula (a), a cyclic imine of the following formula (b), morpholine of the following formula (c) or a benzene of the following formula (d) wherein $R_5$ is hydrogen, halogen or alkyl of 1 to 4 carbon atoms. It is understood that $R_{11}$ and $R_{12}$ in formula (a) and m in formula (b) are as defined for formula (1).

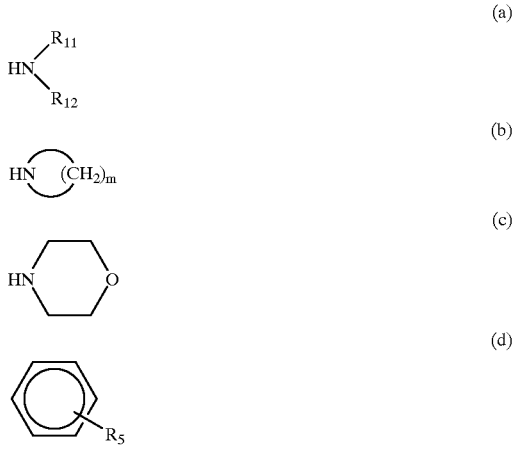

Herein, where it is desired to produce a 4-N,N-dialkylsulfamoyl-1,2-benzenedithiol metal complex, a dialkylamine of formula (a) is used. Where it is desired to produce a 4-pyperidylsulfonyl-1,2-benzenedithiol metal complex, piperidine which is the compound of formula (b) wherein m is 5 is used. Where it is desired to produce a 4-morpholinosulfonyl-1,2-benzenedithiol metal complex, morpholine of formula (c) is used. The amount of the compound of formula (a), (b) or (c) used in this reaction is usually 1.5 to 4.0 mol, preferably 2.0 to 3.0 mol per mol of 3,4-dibromobenzene sulfonic acid used in Step 2. Also, where it is desired to produce a 4-phenylsulfonyl-1,2-benzenedithiol metal complex, benzene is used as the compound of formula (d). The amount of the compound of formula (d) used in this reaction is usually at least 1.0 mol per mol of 3,4-dibromobenzenesulfonyl chloride obtained in Step 2, but since it is also used as a solvent as previously mentioned, the amount is preferably set to 8.0 to 15.0 mol with such a situation taken into account.

In the reaction of this step, halogenated hydrocarbon solvents such as chloroform, carbon tetrachloride and 1,2-ethylene dichloride are preferably used as in Step 2. If the same solvent as in Step 2 is used in Step 3, Steps 2 and 3 can be continuously carried out, which is advantageous from the standpoints of operating efficiency and yield. Also the reaction temperature is preferably set in a range of 15 to 40° C. and more preferably 20 to 30° C. The reaction time is generally 1 to 3 hours although optimum conditions vary with the reaction temperature.

The 4-substituted sulfonyl-1,2-dibromobenzene obtained in this step is represented by the following formula (4) wherein $R_0$ is as defined for $R_{O1}$ and $R_{O2}$ in formula (1)

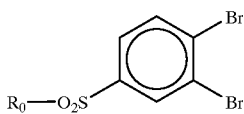

(4)

Step 4

This step is to synthesize a 4-substituted sulfonyl-1,2-benzenedithiol of the following formula (5) by substituting mercapto groups for the bromo groups of the 4-substituted sulfonyl-1,2-dibromobenzene obtained in Step 3. In formula (5), $R_0$ is as defined for $R_{01}$ and $R_{02}$ in formula

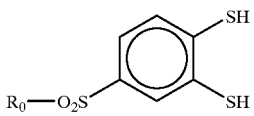

(5)

In this step, the substitution of mercapto groups for bromo groups can be carried out in accordance with the method described in JP-A 25151/1994 and 117225/1993, for example. More particularly, the 4-substituted sulfonyl-1,2-dibromobenzene obtained in Step 3 is reacted with sodium hydrosulfide in the presence of iron powder and sulfur powder as the catalyst whereupon the bromo groups are replaced by mercapto groups, obtaining the end 4-substituted sulfonyl-1,2-benzenedithiol.

The amount of sodium hydrosulfide used herein is usually 1.5 to 4.0 mol and preferably 1.8 to 2.5 mol per mol of the 4-substituted sulfonyl-1,2-dibromobenzene. Also, the amount of iron powder used as the catalyst is usually 0.4 to 2.0 mol and preferably 0.5 to 1.0 mol per mol of the 4-substituted sulfonyl-1,2-dibromobenzene. The amount of sulfur powder used as the catalyst is usually 1.0 to 20.0% by weight and preferably 1.0 to 5.0% by weight based on the 4-substituted sulfonyl-1,2-dibromobenzene.

In this step, the reaction temperature is preferably set in the range of 60 to 140° C., especially 70 to 120° C.

Step 5

The 4-substituted sulfonyl-1,2-benzenedithiol obtained in Step 4 is reacted with a transition metal salt and a quaternary ammonium salt in a lower alcohol to form a substituted benzenedithiol metal complex.

The lower alcohol used herein includes, for example, methanol, ethanol, isopropanol and tert-butanol. Of these, the use of methanol is preferred for economy.

The transition metal salt used herein is a salt of the transition metal (M) contained in formula (1) representing the end substituted benzenedithiol metal complex anion. Examples of the salt include transition metal halides such as copper (II) chloride, cobalt chloride, nickel (II) chloride, iron (III) chloride, hexachloroplatinic (IV) acid, copper (II) bromide, cobalt bromide, cobalt iodide, and nickel iodide, nitrates such as copper nitrate and cobalt nitrate, sulfates such as copper sulfate and cobalt sulfate, and acetates such as copper acetate and cobalt acetate. Preferred transition metal salts are halides, especially chlorides from the standpoints of economy and reactivity.

The amount of the transition metal salt used is preferably set to 0.3 to 10 mol per mol of the 4-substituted sulfonyl-1,2-benzenedithiol. Less than 0.3 time molar amounts result in low yields whereas the use of more than 10 times molar amounts achieves no further improvement in yield and is uneconomical.

Examples of the quaternary ammonium salt include tetra-n-butylammonium bromide, tetra-n-butylammonium chloride, tetraethylammonium bromide, tetraethylammonium chloride, tetraphenylammonium bromide, tetraphenylammonium chloride, tetrabenzylammonium bromide, tetrabenzylammonium chloride, trimethylbenzylammonium bromide, and trimethylbenzylammonium chloride. Of these, tetra-n-butylammonium bromide, tetra-n-butylammonium chloride, tetraethylammonium bromide and tetraethylammonium chloride are preferred from the standpoints of economy and reactivity.

The amount of the quaternary ammonium salt used is preferably set to 0.3 to 1.0 mol, especially 0.4 to 0.9 mol, per mol of the 4-substituted sulfonyl-1,2-benzenedithiol. Less than 0.3 time molar amounts result in low yields whereas the use of more than 1.0 time molar amounts achieves no further improvement in yield and is uneconomical.

It is noted that the reaction of this step is preferably carried out in the presence of an alkoxide because the yield can be increased. The alkoxide which can be used herein includes, for example, sodium methylate, sodium ethylate, and potassium tert-butylate, with the sodium methylate being preferred for economy.

When used, the amount of the alkoxide used is preferably set to 1.5 to 10 mol, especially 2.0 to 3.0 mol, per mol of the 4-substituted sulfonyl-1,2-benzenedithiol. Less than 1.5 times molar amounts result in low yields whereas the use of more than 10 times molar amounts achieves no further improvement in yield and is uneconomical.

The temperature during the reaction of this step is preferably set in a range of 15 to 100° C. and more preferably 20 to 95° C. The reaction time is generally 1 to 3 hours although optimum conditions vary with the reaction temperature.

The optical recording medium of the present invention contains in a recording layer on a substrate a photostabilized cyanine dye comprised of a salt between a substituted benzenedithiol metal complex anion of above formula (1) and a cyanine dye cation, preferably of the following formula (3).

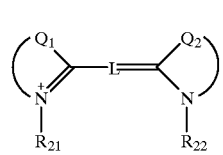

(3)

In the formula, each of $Q_1$ and $Q_2$, which may be the same or different, is a group of atoms for forming a 5-membered nitrogenous heterocyclic ring which may have a fused ring. Exemplary heterocyclic rings are indolenine, 4,5-benzoindolenine, 5,6-benzoindolenine, thiazole, benzothiazole, oxazole, benzoxazole, pyridine, quinoline, imidazole, benzimidazole, selenazole, benzoselenazole, and pyrimidine rings. These rings may have substituted thereon halogen, alkyl, alkoxy, alkylaminosulfamide, alkylamino or aryl groups.

The alkyl groups are preferably those having 1 to 5 carbon atoms in total and may be either normal or branched, and in some cases, include cycloalkyl group. The alkyl groups may further have substituents, examples of which are preferably halogen groups such as fluoro and chloro. Especially preferred alkyl groups are normal or branched alkyl groups having 1 to 4 carbon atoms in total which may have substituents. Examples are methyl, ethyl, n-propyl, isopropyl, n-butyl, isobutyl, s-butyl, t-butyl, and trifluoromethyl.

The alkoxy groups are preferably those in which the alkyl portion has 1 to 4 carbon atoms and may have substituents such as halogen groups (e.g., fluoro). Examples of the alkoxy group include methoxy, ethoxy, propoxy, butoxy, and tetrafluoropropoxy.

The alkylaminosulfamide groups are preferably those in which the alkyl portion has 1 to 4 carbon atoms. Exemplary are methylaminosulfamide, ethylaminosulfamide, propylaminosulfamide, and butylaminosulfamide.

The alkylamino groups are preferably those in which the alkyl portion has 1 to 4 carbon atoms and may be either monoalkylamino or dialkylamino groups. Exemplary are methylamino, dimethylamino, diethylamino and dibutylamino.

The aryl groups may be monocyclic or have a fused ring and may further have substituents. Aryl groups having 6 to 20 carbon atoms in total are preferred. Examples include phenyl and naphthyl, with the phenyl being preferred. These may further have substituents, examples of which include alkyl, aryl, alkoxy, halogen, amino, and sulfamoyl groups, and preferably alkyl of 1 to 5 carbon atoms (e.g., methyl, ethyl, n-propyl, iso-propyl, n-butyl, iso-butyl, sec-butyl, tert-butyl, n-pentyl, iso-pentyl, neo-pentyl, tert-pentyl, and 1-methylbutyl), alkoxy (e.g., methoxy, ethoxy, propoxy, isopropoxy, butoxy, isobutoxy, sec-butoxy, and tert-butoxy), aryl (e.g., phenyl, tolyl, biphenyl, and naphthyl), and halogen (e.g., F, Cl, Br and I, preferably F and Br).

$R_{21}$ and $R_{22}$, which may be the same or different, are alkyl groups. These alkyl groups preferably have 1 to 8 carbon atoms and may be branched. The alkyl groups may have substituents such as hydroxy, halogen (e.g., F, Cl, Br and I), alkoxy (e.g., methoxy, ethoxy and propoxy). L is a methine chain for completing the cyanine dye. L is preferably $—(CH=CH)_n—CH=$ wherein n is 0 to 3, especially 1 to 2.

Of the above-mentioned cyanine dyes, indolenine cyanine dyes of the following formula (2) are preferred. These dyes are the same as the cations constituting the photo-stabilized cyanine dyes of the invention.

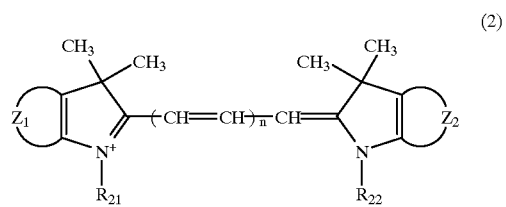

(2)

In the formula, $Z_1$ and $Z_2$, which may be the same or different, are fused benzene rings or fused naphthalene rings. The rings completed by $Z_1$ and $Z_2$ are indolenine rings, 4,5-benzoindolenine rings (inclusive of 6,7-benzoindolenine rings) or 5,6-benzoindolenine rings. These rings may have the above-mentioned substituents attached thereto. $R_{21}$ and $R_{22}$ are as defined above, and n is equal to 1 or 2.

Preferred illustrative examples of the cyanine dye cation of formula (2) are given below. Some are expressed by the formulae (D-1) to (D-8).

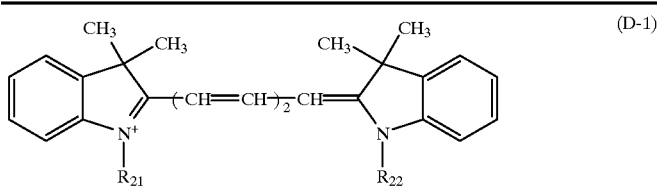

(D-1)

| Dye cation | $R_{21}$ | $R_{22}$ |
|---|---|---|
| D-1-1 | $CH_3$ | $CH_3$ |
| D-1-2 | $CH_3$ | $C_2H_5$ |
| D-1-3 | $CH_3$ | $C_4H_9$ |
| D-1-4 | $C_3H_7$ | $C_4H_9$ |
| D-1-5 | $C_3H_7$ | $C_3H_7$ |
| D-1-6 | $C_4H_9$ | $C_4H_9$ |
| D-1-7 | $C_4H_9$ | $C_2H_4OC_2H_5$ |

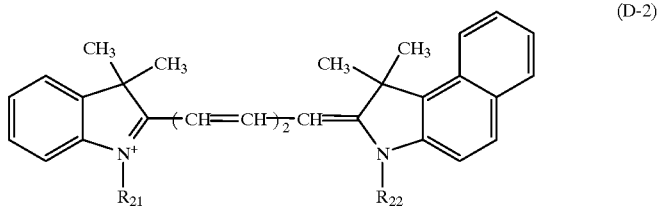

(D-2)

| Dye cation | $R_{21}$ | $R_{22}$ |
|---|---|---|
| D-2-1 | $CH_3$ | $CH_3$ |
| D-2-2 | $CH_3$ | $C_2H_5$ |
| D-2-3 | $CH_3$ | $C_4H_9$ |
| D-2-4 | $C_2H_5$ | $C_4H_9$ |
| D-2-5 | $C_3H_7$ | $C_3H_7$ |
| D-2-6 | $C_3H_7$ | $C_4H_9$ |
| D-2-7 | $C_4H_9$ | $C_4H_9$ |
| D-2-8 | $C_4H_9$ | $C_2H_4OC_2H_5$ |
| D-2-9 | $C_4H_9$ | $C_2H_4OCH_3$ |

-continued
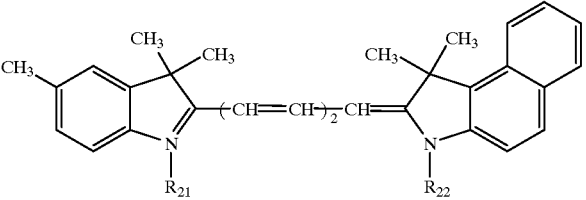
(D-3)
| Dye cation | $R_{21}$ | $R_{22}$ |
|---|---|---|
| D-3-1 | $CH_3$ | $CH_3$ |
| D-3-2 | $CH_3$ | $C_2H_5$ |
| D-3-3 | $CH_3$ | $C_4H_9$ |
| D-3-4 | $C_2H_5$ | $C_4H_9$ |
| D-3-5 | $C_3H_7$ | $C_3H_7$ |
| D-3-6 | $C_3H_7$ | $C_4H_9$ |
| D-3-7 | $C_4H_9$ | $C_4H_9$ |
| D-3-8 | $C_4H_9$ | $C_2H_4OC_2H_5$ |
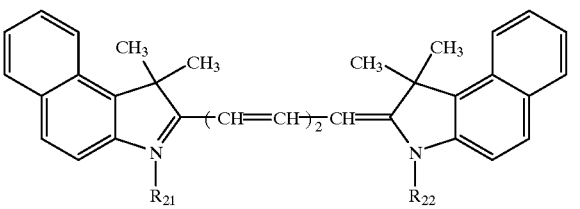
(D-4)
| Dye cation | $R_{21}$ | $R_{22}$ |
|---|---|---|
| D-4-1 | $CH_3$ | $CH_3$ |
| D-4-2 | $CH_3$ | $C_2H_5$ |
| D-4-3 | $CH_3$ | $C_4H_9$ |
| D-4-4 | $C_3H_7$ | $C_3H_7$ |
| D-4-5 | $C_3H_7$ | $C_4H_9$ |
| D-4-6 | $C_4H_9$ | $C_4H_9$ |
| D-4-7 | $C_4H_9$ | $C_2H_4OC_2H_5$ |
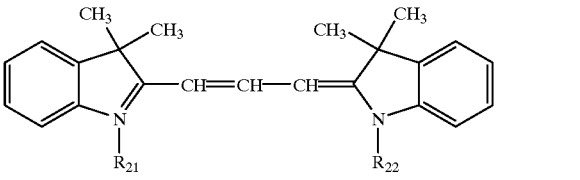
(D-5)
| Dye cation | $R_{21}$ | $R_{22}$ |
|---|---|---|
| D-5-1 | $CH_3$ | $CH_3$ |
| D-5-2 | $CH_3$ | $C_2H_5$ |
| D-5-3 | $CH_3$ | $C_4H_9$ |
| D-5-4 | $C_3H_7$ | $C_3H_7$ |
| D-5-5 | $C_3H_7$ | $C_4H_9$ |
| D-5-6 | $C_4H_9$ | $C_4H_9$ |
| D-5-7 | $C_4H_9$ | $C_2H_4OC_2H_5$ |

-continued (D-6)

| Dye cation | $R_{21}$ | $R_{22}$ |
| --- | --- | --- |
| D-6-1 | $CH_3$ | $CH_3$ |
| D-6-2 | $CH_3$ | $C_2H_5$ |
| D-6-3 | $CH_3$ | $C_4H_9$ |
| D-6-4 | $C_2H_5$ | $C_2H_5$ |
| D-6-5 | $C_3H_7$ | $C_4H_9$ |
| D-6-6 | $C_4H_9$ | $C_4H_9$ |
| D-6-7 | $C_3H_7$ | $C_2H_4OC_2H_5$ |
| D-6-8 | $C_3H_7$ | $C_2H_4OCH_3$ |
| D-6-9 | $C_4H_9$ | $C_2H_4OC_2H_5$ |
| D-6-10 | $C_4H_9$ | $C_2H_4OCH_3$ |

(D-7)

| Dye cation | $R_{21}$ | $R_{22}$ |
| --- | --- | --- |
| D-7-1 | $CH_3$ | $CH_3$ |
| D-7-2 | $CH_3$ | $C_2H_5$ |
| D-7-3 | $CH_3$ | $C_4H_9$ |
| D-7-4 | $C_2H_5$ | $C_2H_5$ |
| D-7-5 | $C_3H_7$ | $C_3H_7$ |
| D-7-6 | $C_3H_7$ | $C_4H_9$ |
| D-7-7 | $C_4H_9$ | $C_4H_9$ |
| D-7-8 | $C_4H_9$ | $C_2H_4OC_2H_5$ |
| D-7-9 | $C_2H_4OC_2H_5$ | $C_4H_9$ |
| D-7-10 | $C_2H_4OCH_3$ | $C_4H_9$ |
| D-7-11 | $C_2H_4OC_2H_5$ | $CH_3$ |
| D-7-12 | $C_2H_4OCH_3$ | $CH_3$ |
| D-7-13 | $C_2H_4OC_2H_5$ | $C_3H_7$ |
| D-7-14 | $C_2H_4OCH_3$ | $C_3H_7$ |

(D-8)

| Dye cation | $R_{21}$ | $R_{22}$ |
| --- | --- | --- |
| D-8-1 | $CH_3$ | $CH_3$ |
| D-8-2 | $CH_3$ | $C_2H_5$ |
| D-8-3 | $CH_3$ | $C_4H_9$ |
| D-8-4 | $C_3H_7$ | $C_3H_7$ |
| D-8-5 | $C_3H_7$ | $C_4H_9$ |
| D-8-6 | $C_4H_9$ | $C_4H_9$ |
| D-8-7 | $C_2H_4OC_2H_5$ | $C_4H_9$ |
| D-8-8 | $C_2H_4OCH_3$ | $C_4H_9$ |
| D-8-9 | $C_2H_4OC_2H_5$ | $C_2H_4OC_2H_5$ |
| D-8-10 | $C_2H_4OC_2H_5$ | $C_2H_5$ |
| D-8-11 | $C_2H_4OCH_3$ | $C_2H_5$ |
| D-8-12 | $C_2H_4OC_2H_5$ | $C_3H_7$ |
| D-8-13 | $C_2H_4OCH_3$ | $C_3H_7$ |
| D-8-14 | $C_2H_4OC_2H_5$ | $CH_3$ |
| D-8-15 | $C_2H_4OCH_3$ | $CH_3$ |

-continued
D-9-1
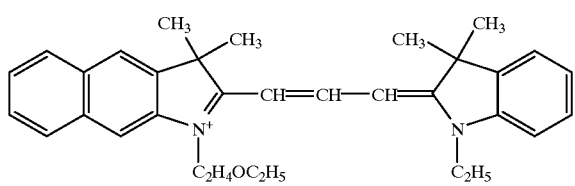
D-9-2
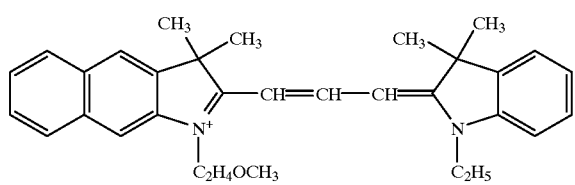
D-9-3
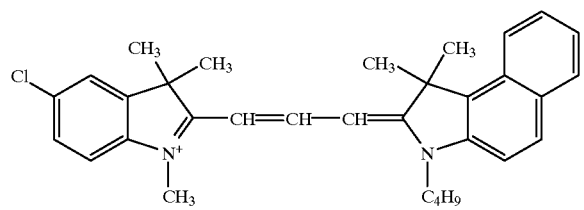
D-9-4
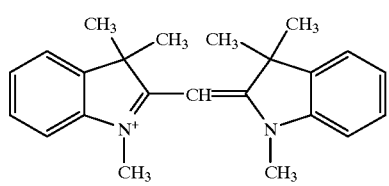
D-9-5
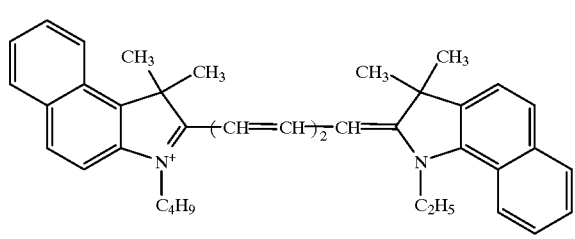
D-9-6
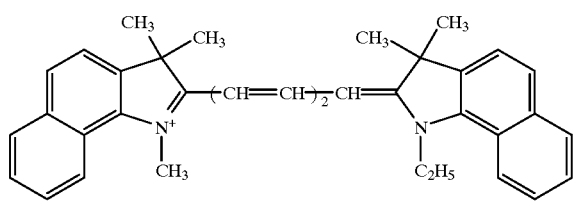
D-10-1
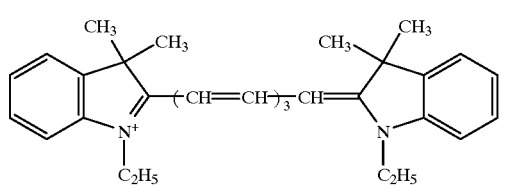

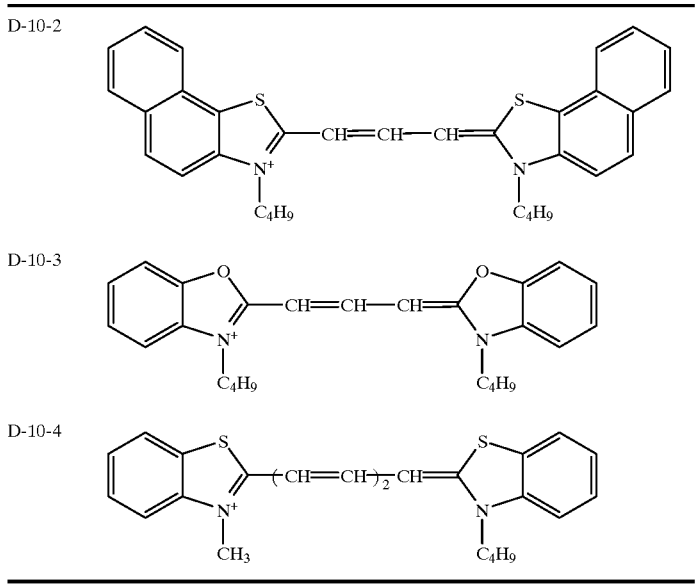

These cyanine dye cations are generally present as cyanine dyes having a counter ion such as $ClO_4^-$, $BF_4^-$ or $I^-$. Using these cyanine dyes or the like and quaternary ammonium salts of the metal complex anions of above formula (1), the photo-stabilized dyes of the invention are obtained.

More particularly, the process starts with a solution of the cyanine dye and the metal complex (quaternary ammonium salt) in an organic solvent, preferably dichloroethane or dichloromethane. Distilled water for washing is added to the solution, and washing is carried out by repeating mixing and separation preferably at least three times, thereby removing the unnecessary ion components. Thereafter, a desiccant, preferably anhydrous calcium chloride is added for dehydration, the desiccant is filtered off, the filtrate is concentrated, and an alcoholic solvent such as methanol is added thereto for causing the photo-stabilized dye of the invention to precipitate and crystallize.

These dyes can be identified by elemental analysis, visible absorption spectroscopy, IR absorption spectroscopy, mass spectroscopy, and nuclear magnetic resonance absorption spectroscopy. These dyes have λmax of about 500 to 750 nm as measured on a dye thin film of 80 nm thick and melting points (mp) of about 80 to 280° C.

Examples of the photo-stabilized dyes used herein are shown in Table 2 below. The dyes are expressed by combinations of cyanine dye cations and substituted benzenedithiol metal complex anions. The photo-stabilized dyes of the present invention are encompassed within the illustrated examples.

TABLE 2

| Compound No. | Dye cation | Complex anion |
|---|---|---|
| 1 | D-8-6 | Q1 |
| 2 | D-8-6 | Q2 |
| 3 | D-8-6 | Q3 |
| 4 | D-8-6 | Q4 |
| 5 | D-8-6 | Q5 |
| 6 | D-8-6 | Q6 |
| 7 | D-1-1 | Q1 |
| 8 | D-1-1 | Q2 |

TABLE 2-continued

| Compound No. | Dye cation | Complex anion |
|---|---|---|
| 9 | D-6-1 | Q1 |
| 10 | D-6-1 | Q2 |
| 11 | D-6-3 | Q1 |
| 12 | D-6-3 | Q3 |
| 13 | D-6-3 | Q4 |
| 14 | D-2-4 | Q1 |
| 15 | D-2-4 | Q2 |
| 16 | D-2-4 | Q1 |
| 17 | D-2-4 | Q5 |
| 18 | D-3-4 | Q1 |
| 19 | D-3-4 | Q4 |
| 20 | D-3-4 | Q5 |
| 21 | D-6-1 | Q1 |
| 22 | D-8-3 | Q3 |
| 23 | D-4-6 | Q1 |
| 24 | D-4-6 | Q3 |
| 25 | D-10-4 | Q1 |
| 26 | D-4-7 | Q1 |
| 27 | D-3-8 | Q1 |
| 28 | D-8-6 | Q7 |
| 29 | D-8-6 | Q8 |
| 30 | D-8-6 | Q9 |
| 31 | D-8-6 | Q10 |
| 32 | D-8-6 | Q11 |
| 33 | D-8-6 | Q12 |
| 34 | D-8-6 | Q13 |
| 35 | D-8-6 | Q14 |
| 36 | D-8-6 | Q15 |
| 37 | D-8-6 | Q16 |
| 38 | D-8-6 | Q17 |
| 39 | D-8-6 | Q18 |
| 40 | D-8-6 | Q19 |
| 41 | D-8-7 | Q2 |
| 42 | D-8-7 | Q4 |
| 43 | D-8-8 | Q4 |
| 44 | D-8-8 | Q6 |
| 45 | D-8-9 | Q1 |
| 46 | D-8-9 | Q6 |
| 47 | D-7-3 | Q1 |
| 48 | D-8-10 | Q4 |
| 49 | D-8-10 | Q6 |
| 50 | D-8-11 | Q1 |
| 51 | D-8-12 | Q4 |
| 52 | D-8-12 | Q6 |

TABLE 2-continued

| Compound No. | Dye cation | Complex anion |
|---|---|---|
| 53 | D-8-13 | Q2 |
| 54 | D-6-6 | Q1 |
| 55 | D-6-6 | Q3 |
| 56 | D-6-5 | Q6 |
| 57 | D-6-9 | Q1 |
| 58 | D-6-10 | Q4 |
| 59 | D-6-7 | Q2 |
| 60 | D-6-8 | Q3 |
| 61 | D-6-8 | Q4 |
| 62 | D-9-1 | Q4 |
| 63 | D-9-1 | Q8 |
| 64 | D-9-2 | Q1 |
| 65 | D-9-3 | Q3 |
| 66 | D-8-14 | Q1 |
| 67 | D-8-15 | Q4 |
| 68 | D-7-7 | Q3 |
| 69 | D-7-8 | Q1 |
| 70 | D-7-9 | Q1 |
| 71 | D-7-10 | Q3 |
| 72 | D-7-11 | Q4 |
| 73 | D-7-12 | Q1 |
| 74 | D-7-13 | Q4 |
| 75 | D-7-14 | Q2 |
| 76 | D-9-4 | Q1 |
| 77 | D-10-1 | Q1 |
| 78 | D-10-2 | Q4 |
| 79 | D-10-3 | Q8 |
| 80 | D-1-2 | Q9 |
| 81 | D-1-3 | Q9 |
| 82 | D-1-4 | Q9 |
| 83 | D-1-5 | Q9 |
| 84 | D-2-1 | Q9 |
| 85 | D-2-2 | Q9 |
| 86 | D-2-3 | Q9 |
| 87 | D-2-5 | Q9 |
| 88 | D-2-6 | Q9 |
| 89 | D-2-8 | Q9 |
| 90 | D-2-9 | Q9 |
| 91 | D-3-1 | Q9 |
| 92 | D-3-2 | Q9 |
| 93 | D-3-3 | Q9 |
| 94 | D-3-5 | Q9 |
| 95 | D-3-6 | Q9 |
| 96 | D-4-1 | Q9 |
| 97 | D-4-2 | Q9 |
| 98 | D-4-3 | Q9 |
| 99 | D-4-4 | Q9 |
| 100 | D-4-5 | Q9 |
| 101 | D-5-6 | Q9 |
| 102 | D-6-6 | Q9 |
| 103 | D-7-7 | Q9 |
| 104 | D-6-5 | Q9 |
| 105 | D-2-4 | Q6 |
| 106 | D-3-4 | Q2 |
| 107 | D-4-6 | Q9 |
| 108 | D-1-4 | Q20 |
| 109 | D-2-2 | Q20 |
| 110 | D-2-5 | Q20 |
| 111 | D-3-4 | Q20 |
| 112 | D-4-6 | Q20 |
| 113 | D-6-6 | Q20 |
| 114 | D-2-5 | Q1 |
| 115 | D-2-2 | Q1 |
| 116 | D-2-5 | Q3 |
| 117 | D-2-2 | Q3 |
| 118 | D-2-1 | Q20 |
| 119 | D-3-2 | Q20 |
| 120 | D-3-8 | Q20 |

The recording layers containing the photo-stabilized dyes described above are preferably used in write-once optical recording discs (such as DVD-R, CD-R and CD-RII), with Compound Nos. 23 to 27 being especially preferred for use in CD-R. Also the photo-stabilized dyes may be used alone or in admixture of two or more. Such recording layers are preferably formed by using coating solutions of the above-described dyes and applying the solutions by spin coating, screen printing and spray coating. Application by the spin coating technique of spreading the coating solution on a rotating substrate is especially preferred.

Preferred examples of the coating solvent used herein include alcoholic solvents such as diacetone alcohol, ethylene glycol monoethyl ether, and TFP (2,2,3,3-tetrafluoropropanol). Especially preferred are alcohols having a vapor pressure of at least 5.3 Torr at 25° C., especially 5.3 to 110 Torr at 25° C., typically TFP and ethylene glycol monoethyl ether having a high evaporation rate. In these solvents, the photo-stabilized cyanine dyes of the present invention have a very high solubility. These solvents may be used alone or in admixture of two or more.

After spin coating as described above, the coating is dried if necessary. The thickness of the recording layer formed in this way is selected as appropriate depending on the desired reflectance and other factors although it is preferably about 50 to 300 nm on the average and especially about 80 to 300 nm on the average.

In the optical recording medium of the invention, the recording layer may contain at least one other dye, a stabilizer such as a quencher, a binder and the like in addition to the photo-stabilized dye described above. A recording layer in the form of a layer of the photo-stabilized dyes described above and a layer of another dye disposed one on the other is also acceptable.

Of these other dyes, cyanine dyes having a different counter anion from the dyes of the invention are preferred, and such dyes can be used regardless of the type of their skeletons including thiazole, oxazole, imidazole, quinoline, pyrimidine, indolenine, and benzindolenine. They may be of an asymmetric structure having two types of rings. No particular limits are imposed on the N-substituted group and ring-substituted group. Also, the linkage groups may be substituted or unsubstituted monomethine, dimethine chains, trimethine chains, pentamethine chains, heptamethine chains, or methine chains of the structure having a 5-membered ring, a 6-membered ring or two or more rings fused thereto. Of these, indolenine dyes having a counter ion such as $ClO_4^-$, $BF_4^-$ or $I^-$ are preferably used. The amount of the other dye added is preferably up to 60% by weight, especially up to 50% by weight of the entire dyes.

From the standpoints of stability and solubility, the above-mentioned indolenine and benzoindolenine cyanine dyes are best suited. For the adjustment of a wavelength and solubility, an asymmetric structure may be used. Also, adjusting the number of carbon atoms on the N side chain in the range of 1 to 5 enables a fine adjustment of wavelength and a further improvement in solubility. In this case, the use of more branched alkyl groups can further improve the solubility.

It is noted that the dye content of the coating solution may be selected in accordance with the thickness of the dye film or the like, preferably in the range of 0.5 to 5% by weight, and more preferably in the range of 0.8 to 2.5% by weight. Since the photo-stabilized cyanine dye of the invention is well soluble, its content in the coating solution can be readily adjusted. Understandably, the coating solution may contain a stabilizer and if desired, a binder, dispersant and other additives as well.

The substrate is in a disc form and, to enable write and read from the back surface of the substrate, is preferably formed of a resin or glass material which is substantially transparent (and preferably has a transmittance of at least 88%) to writing and reading light (having a wavelength of about 500 nm to about 900 nm, typically about 600 to about 800 nm, further typically about 630 to about 690 nm or about 750 nm to about 800 nm). With respect to dimensions, the disc has a diameter of about 64 to 200 mm and a thickness of about 0.6 to 1.2 mm.

On the surface of the substrate where the recording layer is to be formed, a groove is formed for tracking purposes.

The substrate is preferably formed of resins, typically thermoplastic resins such as polycarbonate resins, acrylic resins, amorphous polyolefins, and polystyrene resins. Using these resins, the substrate can be prepared by well-known techniques such as injection molding. Preferably, the groove should be formed simultaneously with the molding of the substrate. Alternatively, a resin layer having the groove may be formed by 2P or other methods after the fabrication of the substrate. Also, a glass substrate is useful as the case may be.

A reflective layer is formed on the recording layer in direct contact relation thereto. Preferably, the reflective layer is formed of a high-reflectance metal or alloy such as Au, Ag, Cu, and AgCu, with Au and Ag being especially preferred. A laminate of layers of such metals is also acceptable. The reflective layer preferably has a thickness of at least 500 Å, and may be formed as by evaporation and sputtering.

A protective film is formed on the reflective layer. The protective film is formed of various resin materials such as UV-curable resins, for instance, and usually has a thickness of about 0.5 μm to about 100 μm. The protective film may be in a layer or sheet form. The protective film may be formed by conventional processes such as spin coating, gravure coating, spray coating and dipping.

The disc structure of DVD-R is a pair of joined discs. It is obtained by forming layers of the same construction as described above on each substrate of 0.6 mm thick (usually of polycarbonate resin), and joining the protective films with an adhesive (such as a thermoplastic resin or thermosetting resin).

The substrates used herein are as previously described for the CD while the groove formed therein has a depth of 0.1 to 0.25 μm, a width of 0.2 to 0.4 μm, and a pitch of 0.5 to 1.0 μm.

The recording layer has a thickness of 500 to 3,000 Å and a complex index of refraction: n=2.0 to 2.6 and k=0.02 to 0.20 at 635 nm.

The optical recording media of the invention are not limited to optical recording discs of the close contact type and may be any discs insofar as they have recording layers containing the dyes. One example is pit formation type optical recording discs of the air sandwich structure, and equivalent results are obtained when the present invention is applied thereto.

EXAMPLE

Examples of the invention are given below, together with Comparative Examples, by way of illustration.

First described are examples of synthesizing salts of substituted benzenethiol metal complexes used in the synthesis of photo-stabilized cyanine dyes according to the invention.

Synthesis Example 1
Synthesis of an Ammonium Salt of Substituted Benzenedithiol Metal Complex Q1

There was furnished a 300-ml four-necked flask equipped with a stirrer, condenser, and thermometer, which was charged with 120 g of 1,2-ethylene dichloride and 76 g (0.32 mol) of 1,2-dibromobenzene. While moderately passing nitrogen gas, 56 g (0.42 mol) of 60% fuming sulfuric acid was added dropwise, and reaction was effected at 70° C. for 2 hours. The reaction solution was cooled, followed by filtration and drying, obtaining 95 g of crude 3,4-dibromobenzenesulfonic acid.

Next, there was furnished a 500-ml four-necked flask equipped with a stirrer, condenser, and thermometer, which was charged with 95 g of the crude 3,4-dibromobenzenesulfonic acid obtained above, 225 g of 1,2-ethylene dichloride, and 28.5 g of N,N-dimethylformamide. Further, 73 g (0.61 mol) of thionyl chloride was added dropwise and reacted at 60 to 65° C. for one hour. After the reaction solution was cooled to room temperature, it was added dropwise to 460 g of water, which was stirred at 0 to 10° C. for ½ hour.

The thus obtained reaction solution was decanted. With the aqueous layer removed, there was obtained 290 g of the organic layer, to which 58 g (0.79 mol) of diethylamine was added dropwise and reacted at room temperature for one hour. To the reaction solution, 200 g of water was further added. After the aqueous layer was removed by decantation, the solvent was distilled off in vacuum, obtaining 87 g of 4-N,N-diethylsulfamoyl-1,2-dibromobenzene. The yield was 73%.

To 10 g of the thus obtained 4-N,N-diethylsulfamoyl-1,2-dibromobenzene, 50 g of N,N-dimethylformamide, 1.2 g (0.022 mol) of iron powder and 0.4 g (0.013 mol) of sulfur powder were added. Further, 5.0 g (0.062 mol) of 70% sodium hydrosulfide in 50 g of N,N-dimethylformamide was added dropwise to this and reacted at 95° C. for 2 hours.

To this solution, 30 g of a 10% sodium methylate/methanol solution (0.056 mol sodium methylate) was added dropwise. After 1 hour of stirring, 2.3 g (0.014 mol) of cupric chloride dihydrate in 10 g of methanol was further added dropwise, and reaction was effected at 72° C. for 1 hour. After the reaction solution was cooled to room temperature, 14.6 g of a 31% tetrabutylammonium bromide/methanol solution (0.014 mol tetrabutylammonium bromide) was added dropwise to the solution, which was stirred at room temperature for 2 hours for reaction to take place.

The thus obtained reaction solution was concentrated and purified by silica gel column chromatography. The fraction was concentrated, obtaining 4.8 g of a dark green solid of the end product, 4-N,N-diethylsulfamoyl-1,2-benzenedithiol copper complex. The yield was 42% based on the 4-N,N-diethylsulfamoyl-1,2-dibromobenzene. The structural formula of the 4-N,N-diethylsulfamoyl-1,2-benzenedithiol copper complex thus obtained is shown below.

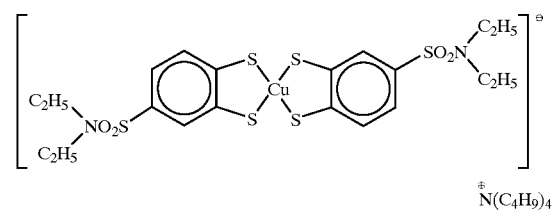

Analytical values and physical properties of the 4-N,N-diethylsulfamoyl-1,2-benzenedithiol copper complex thus obtained are shown in Table 3.

TABLE 3

| | HPLC 99.5% Elemental analysis | | | | |
|---|---|---|---|---|---|
| | C | H | N | S | Cu |
| Calcd (%) | 50.46 | 7.29 | 4.90 | 22.45 | 7.42 |
| Found (%) | 50.0 | 7.1 | 4.9 | 22.2 | 7.40 |

Melting point 31.2° C. (DSC)
UV/visible absorption spectra (solvent, methylene chloride)

| Maximum absorption wavelength (nm) | 396.6, | 339.0, | 272.1, | 251.0 |
|---|---|---|---|---|
| Molar extinction coefficient | 31948, | 12897, | 49481, | 39319 |

IR absorption spectrum (KBr, cm$^{-1}$)

| 2961.2, | 2932.3, | 2872.5, | 2361.4, | 2332.5, |
|---|---|---|---|---|
| 1537.0, | 1440.6, | 1356.7, | 1327.8, | 1155.2, |
| 1114.7, | 1014.4, | 928.6, | 813.8, | 710.7, |
| 693.3, | 609.4, | | | |

Solubility (g/100 g MeOH, 25° C.) 0.83 g

Synthesis Example 2
Synthesis of an Ammonium Salt of Substituted Benzenedithiol Metal Complex Q10

The procedure was the same as in Synthesis Example 1 except that 3.2 g (0.014 mol) of nickel (II) chloride hexahydrate was used instead of 2.3 g (0.014 mol) of cupric chloride dihydrate used in Synthesis Example 1. There was obtained 5.2 g of a solid of 4-N,N-diethylsulfamoyl-1,2-benzenedithiol nickel complex. The yield was 45% based on the 4-N,N-diethylsulfamoyl-1,2-dibromobenzene. The structural formula of the 4-N,N-diethylsulfamoyl-1,2-benzenedithiol nickel complex thus obtained is shown below.

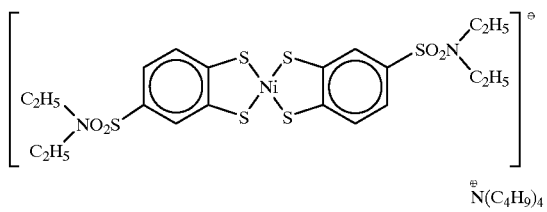

Analytical values and physical properties of the 4-N,N-diethylsulfamoyl-1,2-benzenedithiol nickel complex thus obtained are shown in Table 4.

TABLE 4

| | HPLC 99.4% Elemental analysis | | | | |
|---|---|---|---|---|---|
| | C | H | N | S | Ni |
| Calcd. (%) | 50.75 | 7.33 | 4.93 | 22.58 | 6.89 |
| Found (%) | 50.1 | 7.1 | 4.9 | 22.3 | 6.91 |

Melting point 33.4° C. (DSC)
UV/visible absorption spectra (solvent, methylene chloride)

| Maximum absorption wavelength (nm) | 861.6, | 368.1, | 315.9, | 259.9 |
|---|---|---|---|---|
| Molar extinction coefficient | 13382, | 11757, | 36710, | 42716 |

IR absorption spectrum (KBr, cm$^{-1}$)

| 2961.2, | 2933.2, | 2872.5, | 2361.4, | 1466.6, |
|---|---|---|---|---|
| 1465.7, | 1380.8, | 1354.8, | 1328.7, | 1296.9, |
| 1157.1, | 1014.4, | 931.5, | 819.6, | 712.6, |
| 694.3, | 610.4, | | | |

Solubility (g/100 g MeOH, 25° C.) 0.52 g

Synthesis Example 3
Synthesis of an Ammonium Salt of Substituted Benzenedithiol Metal Complex Q12

There was furnished a 300-ml four-necked flask equipped with a stirrer, condenser, and thermometer, which was charged with 90 g of 1,2-ethylene dichloride and 45 g (0.19 mol) of 1,2-dibromobenzene. While moderately passing nitrogen gas, 53.5 g (0.20 mol) of 30% fuming sulfuric acid was added dropwise, and reaction was effected at 70° C. for 2 hours. The reaction solution was cooled, followed by filtration and drying, obtaining 57 g of crude 3,4-dibromobenzenesulfonic acid.

Next, there was furnished a 500-ml four-necked flask equipped with a stirrer, condenser, and thermometer, which was charged with 57 g of the crude 3,4-dibromobenzenesulfonic acid obtained above, 155 g of 1,2-ethylene dichloride, and 18 g of N,N-dimethylformamide. Further, 38 g (0.32 mol) of thionyl chloride was added dropwise and reacted at 60 to 65° C. for one hour. After the reaction solution was cooled to room temperature, it was added dropwise to 300 g of water, which was stirred at 0 to 10° C. for ½ hour.

The thus obtained reaction solution was decanted. With the aqueous layer removed, there was obtained 191 g of the organic layer, to which 35.7 g (0.42 mol) of piperidine was added dropwise and reacted at room temperature for one hour. To the reaction solution, 150 g of water was further added. After the aqueous layer was removed by decantation, the solvent was distilled off in vacuum, obtaining 53.5 g of 4-piperidylsulfonyl-1,2-dibromobenzene. The yield was 73%.

To 10 g (0.26 mol) of the thus obtained 4-piperidylsulfonyl-1,2-dibromobenzene, 50 g of N,N-dimethylformamide, 0.8 g (0.014 mol) of iron powder and 0.4 g (0.013 mol) of sulfur powder were added. Further, 4.6 g (0.057 mol) of 70% sodium hydrosulfide in 50 g of N,N-dimethylformamide was added dropwise to this and reacted at 100° C. for 2 hours.

To this solution, 31.2 g of a 10% sodium methylate/methanol solution (0.057 mol sodium methylate) was added dropwise. After 1 hour of stirring, 3.4 g (0.014 mol) of nickel (II) chloride hexahydrate in 10 g of methanol was further added dropwise, and reaction was effected at room temperature for 1 hour. Thereafter, 14.6 g of a 32% tetrabutylammonium bromide/methanol solution (0.015 mol tetrabutylammonium bromide) was added dropwise to the solution, which was stirred at room temperature for 2 hours for reaction to take place.

The thus obtained reaction solution was concentrated and purified by silica gel column chromatography. The fraction was concentrated, obtaining 1.8 g of a dark green solid of the end product, 4-piperidylsulfonyl-1,2-benzenedithiol nickel complex. The yield was 16% based on the 4-piperidylsulfonyl-1,2-dibromobenzene. The structural formula of the 4-piperidylsulfonyl-1,2-benzenedithiol nickel complex thus obtained is shown below.

Analytical values and physical properties of the 4-piperidylsulfonyl-1,2-benzenedithiol copper complex thus obtained are shown in Table 6.

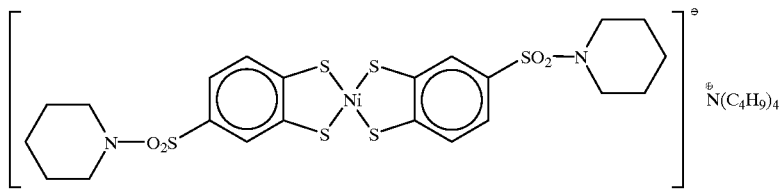

Analytical values and physical properties of the 4-piperidylsulfonyl-1,2-benzenedithiol nickel complex thus obtained are shown in Table 5.

TABLE 5

HPLC 99.5%
Elemental analysis

| | C | H | N | S | Ni |
|---|---|---|---|---|---|
| Calcd. (%) | 51.43 | 7.23 | 4.86 | 22.27 | 6.79 |
| Found (%) | 51.1 | 7.2 | 4.9 | 22.0 | 6.7 |

Melting point 150.9° C. (DSC)
UV/visible absorption spectra (solvent, methylene chloride)

| Maximum absorption wavelength (nm) | 858.9, | 369.7, | 315.6, | 258.6 |
|---|---|---|---|---|
| Molar extinction coefficient | 13138, | 11968, | 37383, | 42094 |

IR absorption spectrum (KBr, cm$^{-1}$)

2940.9, 2852.2, 1467.6, 1355.7, 1336.4,
1297.9, 1166.7, 1103.1, 1099.2, 1053.0,
1051.0, 1039.0, 931.5, 819.6, 717.4,
615.2, 611.3,

TABLE 6

HPLC 99.1%
Elemental analysis

| | C | H | N | S | Cu |
|---|---|---|---|---|---|
| Calcd. (%) | 51.17 | 7.19 | 4.84 | 22.15 | 7.32 |
| Found (%) | 51.4 | 7.2 | 4.6 | 22.3 | 7.2 |

Melting point 140.9° C. (DSC)
UV/visible absorption spectra (solvent, methylene chloride)

| Maximum absorption wavelength (nm) | 617.4, | 396.7, | 339.6, | 272.7, | 250.6 |
|---|---|---|---|---|---|
| Molar extinction coefficient | 318, | 33995, | 13805, | 51874, | 40348 |

IR absorption spectrum (KBr, cm$^{-1}$)

2961.2, 2858.3, 2940.5, 2340.0, 2854.2,
1551.5, 1468.5, 1443.5, 1355.7, 1337.4,
1336.4, 1166.7, 1116.6, 1095.4, 1051.0,
1035.6, 930.5, 813.8, 717.4, 616.1,
614.2, 611.3, 530.3

Synthesis Example 4
Synthesis of an Ammonium Salt of Substituted Benzenedithiol Metal Complex Q3

The procedure was the same as in Synthesis Example 3 except that 2.5 g (0.015 mol) of cupric chloride dihydrate was used instead of 3.4 g (0.014 mol) of nickel (II) chloride hexahydrate used in Synthesis Example 3. There was obtained 5.1 g of a solid of 4-piperidylsulfonyl-1,2-benzenedithiol copper complex. The yield was 45% based on the 4-piperidylsulfonyl-1,2-dibromobenzene. The structural formula of the 4-piperidylsulfonyl-1,2-benzenedithiol copper complex thus obtained is shown below.

Synthesis Example 5
Synthesis of an Ammonium Salt of Substituted Benzenedithiol Metal Complex Q14

There was furnished a 300-ml four-necked flask equipped with a stirrer, condenser, and thermometer, which was charged with 80 g of 1,2-ethylene dichloride and 51 g (0.22 mol) of 1,2-dibromobenzene. While moderately passing nitrogen gas, 38 g (0.29 mol) of 60% fuming sulfuric acid was added dropwise, and reaction was effected at 70° C. for 2 hours. The reaction solution was cooled, followed by filtration and drying, obtaining 51 g of crude 3,4-dibromobenzenesulfonic acid.

Next, there was furnished a 500-ml four-necked flask equipped with a stirrer, condenser, and thermometer, which was charged with 51 g of the crude 3,4-dibromobenzenesulfonic acid obtained above, 155 g (1.98

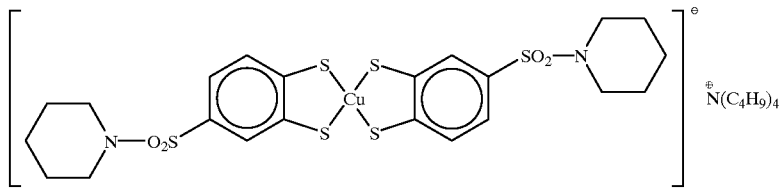

mol) of benzene, and 20 g of N,N-dimethylformamide. Further, 27 g (0.23 mol) of thionyl chloride was added dropwise and reacted at 60 to 65° C. for one hour. After the reaction solution was cooled to room temperature, it was added dropwise to 300 g of water, which was stirred at 0 to 10° C. for ½ hour.

The thus obtained reaction solution was decanted. With the aqueous layer removed, there was obtained 280 g of the organic layer, to which 28 g (0.21 mol) of aluminum chloride was added dropwise and reacted at 75° C. for one hour. To the reaction solution, 300 g of water was further added. After the aqueous layer was removed by decantation, the solvent was distilled off in vacuum, obtaining 38 g of 4-phenylsulfonyl-1,2-dibromobenzene. The yield was 47%.

To 5.1 g (0.014 mol) of the thus obtained 4-phenylsulfonyl-1,2-dibromobenzene, 35 g of N,N-dimethylformamide, 0.7 g (0.013 mol) of iron powder and 0.3 g (0.0094 mol) of sulfur powder were added. Further, 2.5 g (0.031 mol) of 70% sodium hydrosulfide in 25 g of N,N-dimethylformamide was added dropwise to this and reacted at 95° C. for 2 hours.

To this solution, 15.6 g of a 11% sodium methylate/methanol solution (0.0285 mol sodium methylate) was added dropwise. After 1 hour of stirring, 1.7 g (0.0072 mol) of nickel (II) hexahydrate in 6 g of methanol was further added dropwise, and reaction was effected at 72° C. for 1 hour. After the reaction solution was cooled to room temperature, 9.3 g of a 25% tetrabutylammonium bromide/methanol solution (0.0071 mol tetrabutylammonium bromide) was added dropwise to the solution, which was stirred at room temperature for 2 hours for reaction to take place.

The thus obtained reaction solution was concentrated and purified by silica gel column chromatography. The fraction was concentrated, obtaining 2.8 g of a dark green solid of the end product, 4-phenylsulfonyl-1,2-benzenedithiol nickel complex. The yield was 48% based on the 4-phenylsulfonyl-1,2-dibromobenzene. The structural formula of the 4-phenylsulfonyl-1,2-benzenedithiol nickel complex thus obtained is shown below.

Analytical values and physical properties of the 4-phenylsulfonyl-1,2-benzenedithiol nickel complex thus obtained are shown in Table 7.

TABLE 7

| | HPLC 96.1% Elemental analysis | | | | |
|---|---|---|---|---|---|
| | C | H | N | S | Ni |
| Calcd. (%) | 55.74 | 6.08 | 1.62 | 22.32 | 6.81 |
| Found (%) | 55.1 | 5.9 | 1.6 | 23.0 | 6.5 |

| Melting point 167.9° C. (DSC) UV/visible absorption spectra (solvent, methylene chloride) | | | | |
|---|---|---|---|---|
| Maximum absorption wavelength (nm) | 861.4, | 444.6, | 316.9, | 261.2 |
| Molar extinction coefficient | 13394, | 29829, | 39695, | 35217 |
| IR absorption spectrum (KBr, cm$^{-1}$) | | | | |
| 2958.3, | 2871.5, | 2361.4, | 2338.3, | 1551.5, |
| 1445.4, | 1307.5, | 1157.1, | 1107.9, | 1071.3, |
| 1039.5, | 821.5, | 722.2, | 686.5, | 619.1, |
| 589.2, | | | | |

Synthesis Example 6

Synthesis of an Ammonium Salt of Substituted Benzenedithiol Metal Complex Q4

The procedure was the same as in Synthesis Example 1 except that 1.2 g (0.0070 mol) of cupric chloride dihydrate was used instead of 1.7 g (0.0072 mol) of nickel (II) chloride hexahydrate used in Synthesis Example 5. There was obtained 3.3 g of a solid of 4-phenylsulfonyl-1,2-benzenedithiol copper complex. The yield was 57% based on the 4-phenylsulfonyl-1,2-dibromobenzene. The structural formula of the 4-phenylsulfonyl-1,2-benzenedithiol copper complex thus obtained is shown below.

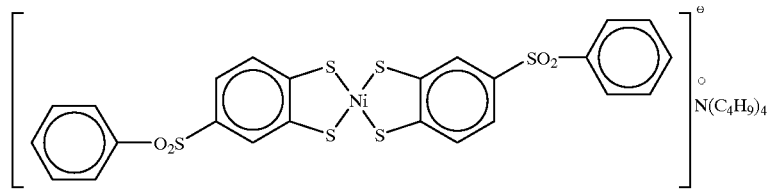

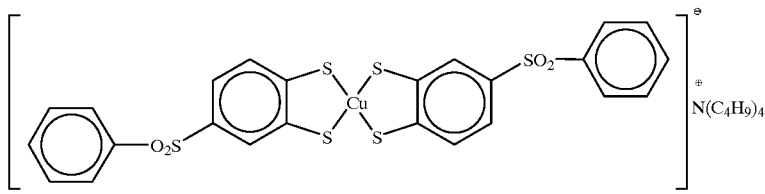

Analytical values and physical properties of the 4-phenylsulfonyl-1,2-benzenedithiol copper complex thus obtained are shown in Table 8.

TABLE 8

HPLC 99.3%
Elemental analysis

|  | C | H | N | S | Cu |
|---|---|---|---|---|---|
| Calcd. (%) | 55.43 | 6.05 | 1.61 | 22.20 | 7.3 |
| Found (%) | 55.4 | 6.1 | 1.9 | 22.3 | 7.2 |

Melting point 38.0° C. (DSC)
UV/visible absorption spectra (solvent, methylene chloride)

| Maximum absorption wavelength (nm) | 600.7, | 395.0, | 347.0, | 283.8, | 253.8, | 227.6 |
| Molar extinction coefficient | 390, | 37095, | 15557, | 44969, | 35117, | 32280 |

IR absorption spectrum (KBr, cm$^{-1}$)

2959.3, 2872.5, 2361.4, 2336.4, 1539.9,
1444.4, 1359.6, 1305.6, 1156.1, 1117.6,
1116.6, 1071.3, 1034.6, 816.7, 722.2,
680.8, 618.1, 588.2

Synthesis Example 7
Synthesis of an Ammonium Salt of Substituted Benzenedithiol Metal Complex Q9

Next, There was furnished a 300-ml four-necked flask equipped with a stirrer, condenser, and thermometer, which was charged with 90 g of 1,2-ethylene dichloride and 45 g (0.19 mol) of 1,2-dibromobenzene. While moderately passing nitrogen gas, 53.5 g (0.2 0 mol) of 30% fuming sulfuric acid was added dropwise, and react ion was effected at 70° C. for 2 hours. The reaction solution was cooled, followed by filtration and drying, obtaining 57 g of crude 3,4-dibromobenzenesulfonic acid.

Next, there was furnished a 500-ml four-necked flask equipped with a stirrer, condenser, and thermometer, which was charged with 57 g of the crude 3,4-dibromobenzenesulfonic acid obtained above, 155 g of 1,2-ethylene dichloride, and 18 g of N,N-dimethylformamide. Further, 38 g (0.32 mol) of thionyl chloride was added dropwise and reacted at 60 to 65° C. for one hour. After the reaction solution was cooled to room temperature, it was added dropwise to 300 g of water, which was stirred at 0 to 10° C. for ½ hour.

The thus obtained reaction solution was decanted. With the aqueous layer removed, there was obtained 191 g of the organic layer, to which 36.6 g (0.42 mol) of morpholine was added dropwise and reacted at room temperature for one hour. To the reaction solution, 150 g of water was further added. After the aqueous layer was removed by decantation, the solvent was distilled off in vacuum, obtaining 54.9 g of 4-morpholinosulfonyl-1,2-dibromobenzene. The yield was 75%.

To 10 g (0.026 mol) of the thus obtained 4-morpholinosulfonyl-1,2-dibromobenzene, 50 g of N,N-dimethylformamide, 0.8 g (0.014 mol) of iron powder and 0.4 g (0.013 mol) of sulfur powder were added. Further, 4.6 g (0.057 mol) of 70% sodium hydrosulfide in 50 g of N,N-dimethylformamide was added dropwise to this and reacted at 100° C. for 2 hours.

To this solution, 31.2 g of a 10% sodium methylate/methanol solution (0.057 mol sodium methylate) was added dropwise. After 1 hour of stirring, 2.5 g (0.015 mol) of cupric chloride dihydrate in 10 g of methanol was further added dropwise, and reaction was effected at room temperature for 1 hour. Thereafter, 14.6 g of a 32% tetrabutylammonium bromide/methanol solution (0.015 mol tetrabutylammonium bromide) was added dropwise to the solution, which was stirred at room temperature for 2 hours for reaction to take place.

The thus obtained reaction solution was concentrated and purified by silica gel column chromatography. The fraction was concentrated, obtaining 4.8 g of a dark green solid of the end product, 4-morpholinosulfonyl-1,2-benzenedithiol copper complex. The yield was 42% based on the 4-morpholinosulfonyl-1,2-dibromobenzene. The structural formula of the 4-morpholinosulfonyl-1,2-benzenedithiol copper complex thus obtained is shown below.

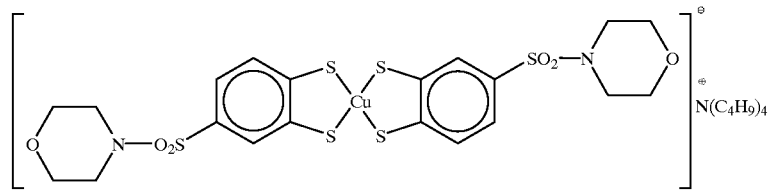

Analytical values and physical properties of the 4-morpholinosulfonyl-1,2-benzenedithiol copper complex thus obtained are shown in Table 9.

TABLE 9

| | HPLC 99.5% Elemental analysis | | | | |
|---|---|---|---|---|---|
| | C | H | N | S | Cu |
| Calcd. (%) | 48.87 | 6.61 | 4.75 | 21.74 | 7.18 |
| Found (%) | 48.5 | 6.6 | 4.8 | 21.6 | 7.1 |

Melting point 233.6° C. (DSC)
UV/visible absorption spectra (solvent, methylene chloride)

| Maximum absorption wavelength (nm) | 395.6 | 339.6 | 273.4 | 251.0 |
|---|---|---|---|---|
| Molar extinction coefficient | 35100 | 14200 | 53200 | 39900 |

IR absorption spectrum (KBr, cm$^{-1}$)

| 3448.1 | 2960.2 | 2931.3 | 2858.0 | 1550.5 |
|---|---|---|---|---|
| 1448.3 | 1382.7 | 1344.2 | 1294.0 | 1261.2 |
| 1238.1 | 1166.7 | 1114.7 | 1070.3 | 1035.6 |
| 943.0 | 883.3 | 852.4 | 815.8 | 725.1 |
| 680.8 | 624.8 | 609.4 | 561.2 | 532.3 |
| 497.6 | | | | |

Example 1

Synthesis of Photo-Stabilized Cyanine Dye

Synthesis of Exemplary Compound No. 1

In 20 ml of 1,2-ethylene dichloride were dissolved 0.001 mol of a $ClO_4^-$ salt of exemplary cyanine dye cation D-8-6 and 0.001 mol of the tetrabutylammonium salt of metal complex anion Q1 (substituent R: —$N(C_2H_5)_2$) obtained in Synthesis Example 1. Using a separatory funnel, the solution was thoroughly shaken together with 20 ml of distilled water, and the aqueous layer was separated off. The 1,2-ethylene dichloride layer was further washed twice with 20 ml of distilled water. Particulate anhydrous calcium chloride was added to the 1,2-ethylene dichloride layer for dehydration. After this was left to stand overnight, the calcium chloride was filtered off. The filtrate was concentrated by means of an evaporator. Methanol was added to the concentrate, causing the end salt-forming dye (Exemplary Compound No. 1) to precipitate and crystallize.

Synthesis of Exemplary Compound Nos. 2–5, 7, 18, 27, 94, 105–107

Like Exemplary Compound No. 1, these compounds were synthesized from a salt of a corresponding cyanine dye cation and a salt of a metal complex anion.

Understandably, other Exemplary Compounds in Table 2 could also be similarly synthesized.

Synthesis of Comparative Dyes

Like Exemplary Compound No. 1, comparative dye compounds, Nos. 201–203 and 205 were synthesized by using salts of metal complexes (Q21 salt and Q22 salt) shown below and combining them with dye cations D-1-1, D-8-6, D-6-1 and D-3-4 shown below. It is noted that a $ClO_4^-$ salt of dye cation 6-1 was prepared as compound No. 204.

| Compound No. | Metal complex anion | Dye cation |
|---|---|---|
| 201 | Q21 | D-1-1 |
| 202 | Q21 | D-8-6 |
| 203 | Q22 | D-6-1 |
| 204 | ($ClO_4^-$) | D-6-1 |
| 205 | Q22 | D-3-4 |

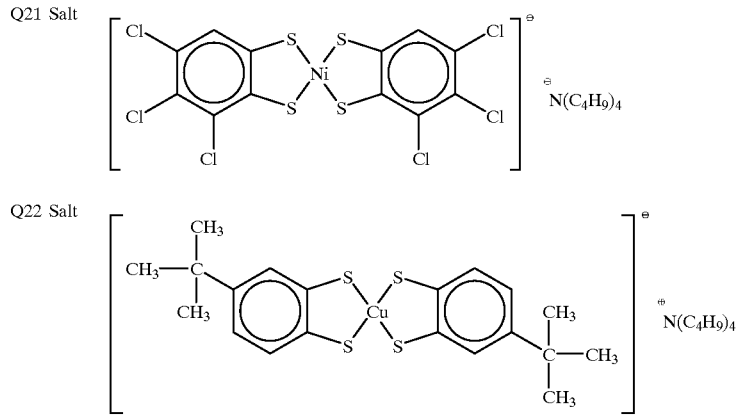

Q21 Salt

Q22 Salt

These cyanine dyes could be identified from the measurments of absorption maximum wavelength, molar extinction coefficient and by the quantitative analysis of the center metal.

The photo-stabilized dyes of the invention synthesized above have an improved solubility in solvents and especially, a very high solubility in TFP and other solvents having a high evaporation rate. As opposed to the substituted benzenedithiol metal complexes (tetrabutylammonium salts) themselves generally having low melting points, most of the salts formed therefrom using the cyanine dyes except for some exceptional salts have high melting points and are stabilized. Table 10 below shows the melting points of the metal complexes and the melting points of Inventive Compound Nos. 1–5, 105 and 87 which are the salts formed therefrom using the cyanine dyes.

TABLE 10

| Compound No. | Metal complex anion | Dye cation | Melting point of metal complex (N⁺(Bu)₄ salt), ° C. | Melting point of compound after salt formation, ° C. |
|---|---|---|---|---|
| 1 | Q1 | D-8-6 | 31 | 95 |
| 2 | Q2 | D-8-6 | 41 | 195 |
| 3 | Q3 | D-8-6 | 141 | 140 |
| 4 | Q4 | D-8-6 | 38 | 125 |
| 5 | Q5 | D-8-6 | — | 150 |
| 105 | Q6 | D-2-4 | 130 | 216 |
| 87 | Q9 | D-2-5 | 234 | 207 |

Example 2

Preparation of Samples Having Optical Recording Layer Formed Thereon

Polycarbonate was injection molded into a substrate having a diameter of 120 mm and a thickness of 1.2 mm. No grooves were formed on the surface of the substrate where the recording layer was to be formed.

Sample 11

On this resin substrate, a 1.0 wt % 2,2,3,3-tetrafluoropropanol solution of a photo-stabilized dye obtained as in Example 1 using the ionic bond compound (Compound No. 7) of the invention between substituted benzenedithiol metal complex anion Q1 and cyanine dye cation D-1-1 as applied by spin coating and dried to form a dye film of 100 nm thick. The drying time was 20 seconds. The film was irradiated with light from a xenon (Xe) lamp at 80,000 lux on the film surface. Even after 100 hours of irradiation, 97% of the dye was left (dye retention 97%).

The dye retention (%) was determined by measuring the initial transmittance $T_0$ (%) of the film before light irradiation and the transmittance T (%) of the film after light radiation and calculating in accordance with the following equation.

$$\text{Dye retention (\%)} = (100-T)/(100-T_0) \times 100$$

This definition is the same throughout the specification.

The results are shown in Table 11.

Sample 12

Like Sample 11, a dye film of 100 nm thick was formed by using the photo-stabilized cyanine dye (Compound No. 1) between substituted benzenedithiol metal complex anion Q1 and cyanine dye cation D-8-6 and applying a solution thereof, followed by drying. The drying time was 20 seconds. The film was irradiated with light from a Xe lamp at 80,000 lux. Even after 100 hours of irradiation, 98% of the dye was left. The results are shown in Table 11.

Sample 13

Like Sample 11, a dye film of 100 nm thick was formed by using the photo-stabilized cyanine dye (Compound No. 2) between substituted benzenedithiol metal complex anion Q2 and cyanine dye cation D-8-6 and applying a solution thereof, followed by drying. The drying time was 20 seconds. The film was irradiated with light from a Xe lamp at 80,000 lux. Even after 100 hours of irradiation, 98% of the dye was left. The results are shown in Table 11.

Sample 14

Like Sample 11, a dye film of 100 nm thick was formed by using the photo-stabilized cyanine dye (Compound No. 3) between substituted benzenedithiol metal complex anion Q3 and cyanine dye cation D-8-6 and applying a solution thereof, followed by drying. The drying time was 20 seconds. The film was irradiated with light from a Xe lamp at 80,000 lux. Even after 100 hours of irradiation, 99% of the dye was left. The results are shown in Table 11.

Sample 15

A 2.3 wt % ethyl cellosolve solution of the photo-stabilized cyanine dye (Compound No. 1) between substituted benzenedithiol metal complex anion Q1 and cyanine dye cation D-8-6 was applied by spin coating and dried to form a dye film of 100 nm thick. The drying time was 40 seconds. The film was irradiated with light from a Xe lamp at 80,000 lux. Even after 100 hours of irradiation, 98% of the dye was left. The results are shown in Table 11.

Sample 16

Like Sample 15, a dye film of 100 nm thick was formed by using the photo-stabilized cyanine dye (Compound No. 2) between substituted benzenedithiol metal complex anion Q2 and cyanine dye cation D-8-6 and applying a solution thereof, followed by drying. The drying time was 40 seconds. The film was irradiated with light from a Xe lamp at 80,000 lux. Even after 100 hours of irradiation, 97% of the dye was left. The results are shown in Table 11.

Sample 17

Like Sample 11, a dye film of 100 nm thick was formed by using the photo-stabilized cyanine dye (Compound No. 18) between substituted benzenedithiol metal complex anion Q1 and cyanine dye cation D-3-4 and applying a solution thereof, followed by drying. The drying time was 20 seconds. The film was irradiated with light from a Xe lamp at 80,000 lux. Even after 100 hours of irradiation, 99% of the dye was left. The results are shown in Table 11.

Sample 18

Like Sample 11, a dye film of 100 nm thick was formed by using the photo-stabilized cyanine dye (Compound No. 106) between substituted benzenedithiol metal complex anion Q2 and cyanine dye cation D-3-4 and applying a solution thereof, followed by drying. The drying time was 20 seconds. The film was irradiated with light from a Xe lamp at 80,000 lux. Even after 100 hours of irradiation, 97% of the dye was left. The results are shown in Table 11.

TABLE 11

| Sample No. | Compound No. | Metal complex anion | Dye cation | Coating solvent | Coating time sec/ substrate | Film thickness nm | 100-h light resistance % |
|---|---|---|---|---|---|---|---|
| 11 | 7 | Q1 | D-1-1 | TFP | 20 | 100 | 97 |
| 12 | 1 | Q1 | D-8-6 | TFP | 20 | 100 | 98 |
| 13 | 2 | Q2 | D-8-6 | TFP | 20 | 100 | 98 |
| 14 | 3 | Q3 | D-8-6 | TFP | 20 | 100 | 99 |

TABLE 11-continued

| Sample No. | Compound No. | Metal complex anion | Dye cation | Coating solvent | Coating time sec/ substrate | Film thickness nm | 100-h light resistance % |
|---|---|---|---|---|---|---|---|
| 15 | 1 | Q1 | D-8-6 | ethyl cellosolve | 40 | 100 | 98 |
| 16 | 2 | Q2 | D-8-6 | ethyl cellosolve | 40 | 100 | 97 |
| 17 | 18 | Q1 | D-3-4 | TFP | 20 | 100 | 98 |
| 18 | 106 | Q2 | D-3-4 | TFP | 20 | 100 | 97 |

As is evident from Table 11, using the photo-stabilized cyanine dyes of the invention, optical recording layers can be quite briefly formed when the dyes are applied to optical discs such as DVD-R and CD-R, leading to drastic improvements in manufacturing efficiency. The layers exhibit physically stable properties, from which write/read characteristics are expected to be good as well. It is noted that above sample Nos. 11 to 16 are especially suited for DVD-R and sample Nos. 17 and 18 are especially suited for CD-R.

Comparative Example 1

Preparation of Samples Having Optical Recording Layer Formed Thereon

Sample 21

Like Example 2, it was attempted to apply a 2,2,3,3-tetrafluoropropanol (TFP) solution of a cyanine dye salt (Comparative Compound No. 201) between metal complex anion Q21 and cyanine dye cation D-1-1 onto a substrate by spin coating. Coating was impossible because the salt-forming dye was substantially insoluble in TFP. The results are shown in Table 12.

Sample 22

Like Sample 21, it was attempted to apply a 2,2,3,3-tetrafluoropropanol (TFP) solution of a cyanine dye salt (Comparative Compound No. 202) between metal complex anion Q21 and cyanine dye cation D-8-6. Coating was impossible because of the low solubility of the salt-forming dye. The results are shown in Table 12.

Sample 23

Like Sample 21, it was attempted to apply a 2,2,3,3-tetrafluoropropanol (TFP) solution of a cyanine dye salt (Comparative Compound No. 203) between anion Q22 forming the salt of metal complex (Q22 salt) having a high solubility and cyanine dye cation D-6-1. The salt-forming dye was dissolved only 0.5% by weight, failing to provide a satisfactory film thickness. The results are shown in Table 12.

Sample 24

Like Sample 21, a 3 wt % 2,2,3,3-tetrafluoropropanol (TFP) solution of a perchlorate ($ClO_4$) salt of cyanine dye cation D-6-1 (Comparative Compound No. 204) was coated and dried to form a dye film of 190 nm thick. The coating time was 30 seconds. When the film was irradiated with light from a Xe lamp at 80,000 lux, the film was decolorized to be colorless and transparent after 20 hours. The results are shown in Table 12.

Sample 25

Like Sample 21, a diacetone alcohol solution of a cyanine dye salt (Comparative Compound No. 205) between the salt of metal complex (Q22 salt) having a high solubility and cyanine dye cation D-3-4 was coated and dried to form a uniform dye film of 200 nm thick. The coating time required was 60 seconds. When the film was irradiated with light from a Xe lamp at 80,000 lux, 95% by weight of the dye was left even after 100 hours. The results are shown in Table 12.

Sample 26

Like Sample 21, a diacetone alcohol solution of a cyanine dye salt (Comparative Compound No. 203) between anion Q22 forming the salt of metal complex (Q22 salt) having a high solubility and cyanine dye cation D-6-1 was coated and dried to form a uniform dye film of 190 nm thick. The coating time required was 60 seconds. When the film was irradiated with light from a Xe lamp at 80,000 lux, only 45% of the dye was left after 100 hours. The results are shown in Table 12.

TABLE 12

| Sample No. | Compound No. | Metal complex anion | Dye cation | Coating solvent | Coating time sec/ substrate | Film thickness nm | 100-h light resistance % | Remarks |
|---|---|---|---|---|---|---|---|---|
| 21* | 201* | Q21* | D-1-1 | TFP | — | — | — | not dissolved |
| 22* | 202* | Q21* | D-8-6 | TFP | — | — | — | short solubility |
| 23* | 203* | Q22* | D-6-1 | TFP | 30 | <100 | 80 | small thickness |
| 24* | 204* | [$ClO_4^-$*] | D-6-1 | TFP | 30 | 190 | decolorized after 20 h | |
| 25* | 205* | Q22* | D-3-4 | diacetone alcohol | 60 | 200 | 95 | |
| 26* | 203* | Q22* | D-6-1 | diacetone alcohol | 60 | 190 | 45 | |

*comparison

As is evident from Tables 11 and 12, as opposed to the prior art wherein coating is possible only with solvents having a low evaporation rate such as diacetone alcohol, the photo-stabilized cyanine dyes of the invention are well soluble in solvents having a high evaporation rate such as TFP, achieving a drastic reduction of the coating time to one half of the prior art. With respect to the monomethine cyanine dyes and trimethine cyanine dyes belonging to the short-wavelength recording dyes which are expected to find the future use, the invention succeeded in significantly improving their light resistance over prior art photostabilized dyes having a quencher anion as the counter ion. Cyanine dyes having $ClO_4^-$, $BF_4^-$ or $I^-$ as the counter ion are well soluble in TFP, but practically unacceptable because they readily fade and deteriorate by light irradiation.

Understandably, equivalent results are obtained with the remaining exemplary compounds of the invention shown in Table 2.

Example 5

Preparation of Optical Recording Disc (CD-R)

Polycarbonate was injection molded into a substrate having a diameter of 120 mm and a thickness of 1.2 mm. A tracking groove having a pitch of 1.6 μm, a width of 0.48 μm and a depth of 160 nm was formed in the surface of the substrate where the recording layer was to be formed.

On the polycarbonate resin substrate, a recording layer containing Exemplary Compound No. 27 (D-3-8/Q1) was formed to a thickness of 2,000 Å (200 nm) by spin coating. The coating solution used herein was a 1.0 wt % 2,2,3,3-tetrafluoropropanol solution. Next, on the recording layer, a reflective film of gold was formed to a thickness of 850 Å by sputtering. Further, a transparent protective layer of UV-curable acrylic resin was formed (thickness 5 μm), obtaining a disc sample, No. 31.

A disc sample, No. 32 was prepared as was disc sample No. 31 except that a recording layer was formed using a coating solution further containing 40 wt % based on the above-mentioned dye of a $ClO_4^-$ salt of D-3-8 as a cyanine dye.

The thus obtained disc sample No. 31 was examined for recording characteristics at a linear velocity of 1.2 m/sec using a laser diode (oscillation wavelength 780 nm), confirming possible recording with a laser power of 6.0 mW. Read characteristics were also examined using a laser diode (oscillation wavelength 780 nm), finding a reflectance of higher than 70%, a modulation of 68%, and a Rtop of 67%. This sample was found to be an optical recording disc exhibiting satisfactory characteristics complying with the Orange Book Standard.

Like disc sample No. 31, disc sample No. 32 was similarly examined for recording characteristics, confirming possible recording with a laser power of 5.7 mW. Like disc sample No. 31, disc sample No. 32 was similarly examined for read characteristics, finding a reflectance of higher than 70%, a modulation of 70%, and a Rtop of 68%. This sample was found to be an optical recording disc exhibiting satisfactory characteristics complying with the Orange Book Standard.

Example 6

Preparation of Optical Recording Disc (DVD-R)

Polycarbonate was injection molded into a substrate having a diameter of 120 mm and a thickness of 0.6 mm. A tracking groove having a pitch of 0.8 Em, a width of 0.30 μm and a depth of 140 nm was formed in the surface of the substrate where the recording layer was to be formed.

On the polycarbonate resin substrate, a recording layer containing Exemplary Compound No. 103 (D-7-7/Q9) was formed to a thickness of 1,000 Å (100 nm) by spin coating. The coating solution used herein was a 1.2 wt % 2,2,3,3-tetrafluoropropanol solution. Next, on the recording layer, a reflective film of gold was formed to a thickness of 850 Å by sputtering. Further, a transparent protective layer of UV-curable acrylic resin was formed (thickness 5 μm). Two such substrates were adhesively joined with the protective films inside, obtaining a disc sample, No. 33.

A disc sample, No. 34 was prepared as was disc sample No. 33 except that a recording layer was formed using a coating solution further containing 30 wt % based on the above-mentioned dye of a $ClO_4^-$ salt of D-8-6 as a cyanine dye.

The thus obtained disc sample Nos. 33 and 34 were examined for write/read characteristics at a linear velocity of 3.8 m/sec using a laser (oscillation wavelength 635 nm), confirming satisfactory characteristics.

Example 7

Disc samples were prepared as in Example 5 except that the recording layer was formed using a 1.2 wt % 2,2,3,3-tetrafluoropropanol solution containing a photo-stabilized cyanine dye according to the invention and a cyanine dye in a combination and weight ratio as shown in Table 13. They were examined for write/read characteristics (disc characteristics) under the same conditions as in Example 5.

With respect to write characteristics, an optimum recording power was examined. With respec to read characteristics, a reflectance, Rtop, modulation ($I_{11}$Mod), and jitter (Jitter) were examined. For all the samples, the reflectance was higher than 70%. The Rtop, modulation, jitter and optimum recording power are shown in Table 13. As to the jitter, both the jitter of a land portion and the jitter of a pit portion are reported.

TABLE 13

| Sample No. | Compound No. | Metal complex anion | Dye cation | Additional dye | Compound/ additional dye (weight ratio) | Rtop (%) | $I_{11}$Mod (%) | Jitter (ns) Land/ groove | Optimum recording power (mW) |
|---|---|---|---|---|---|---|---|---|---|
| 51 | 87 | Q9 | D-2-5 | (D-4-6) · $ClO_4$ | 50/50 | 68 | 72 | 23.5/24.0 | 5.7 |
| 52 | 87 | Q9 | D-2-5 | (D-4-6) · $ClO_4$ | 65/35 | 67 | 70 | 19.2/21.2 | 5.9 |
| 53 | 87 | Q9 | D-2-5 | (D-4-6) · $ClO_4$ | 75/25 | 67 | 70 | 21.0/22.0 | 6.0 |
| 54 | 85 | Q9 | D-2-2 | (D-4-6) · $ClO_4$ | 50/50 | 69 | 72 | 22.0/24.0 | 5.8 |
| 55 | 85 | Q9 | D-2-2 | (D-4-6) · $ClO_4$ | 65/35 | 68 | 70 | 18.8/19.8 | 5.9 |
| 56 | 85 | Q9 | D-2-2 | (D-4-6) · $ClO_4$ | 75/25 | 67 | 68 | 20.0/20.2 | 6.1 |
| 57 | 87 | Q9 | D-2-5 | (D-4-1) · $BF_4$ | 50/50 | 69 | 70 | 24.2/24.0 | 5.8 |
| 58 | 87 | Q9 | D-2-5 | (D-4-1) · $BF_4$ | 65/35 | 68 | 68 | 22.0/21.0 | 6.0 |
| 59 | 107 | Q9 | D-4-6 | (D-3-5) · $ClO_4$ | 50/50 | 68 | 72 | 18.2/19.2 | 6.2 |

TABLE 13-continued

| Sample No. | Compound No. | Metal complex anion | Dye cation | Additional dye | Compound/ additional dye (weight ratio) | Rtop (%) | I₁₁Mod (%) | Jitter (ns) Land/ groove | Optimum recording power (mW) |
|---|---|---|---|---|---|---|---|---|---|
| 60 | 107 | Q9 | D-4-6 | (D-3-5) · ClO₄ | 65/35 | 68 | 70 | 19.4/20.5 | 6.5 |
| 61 | 114 | Q1 | D-2-5 | (D-4-6) · ClO₄ | 60/40 | 67 | 69 | 24.8/27.0 | 6.3 |

It is evident from Table 13 that all the samples are optical recording discs exhibiting satisfactory characteristics complying with the Orange Book Standard.

Example 8

Disc samples were prepared as in Example 7 except that a reflective film of silver was used instead of the reflective film of gold. They were examined for write/read characteristics as in Example 7.

For all the samples, the reflectance was higher than 70%. The Rtop, modulation, jitter, and optimum recording power are shown in Table 14.

TABLE 14

| Sample No. | Compound No. | Metal complex anion | Dye cation | Additional dye | Compound/ additional dye (weight ratio) | Rtop (%) | I₁₁Mod (%) | Jitter (ns) Land/ groove | Optimum recording power (mW) |
|---|---|---|---|---|---|---|---|---|---|
| 71 | 87 | Q9 | D-2-5 | (D-4-6) · ClO₄ | 50/50 | 69 | 72 | 20.5/20.0 | 5.6 |
| 72 | 87 | Q9 | D-2-5 | (D-4-6) · ClO₄ | 65/35 | 67 | 71 | 21.0/20.2 | 5.9 |
| 73 | 87 | Q9 | D-2-5 | (D-4-6) · ClO₄ | 75/25 | 67 | 71 | 18.4/18.0 | 6.0 |
| 74 | 85 | Q9 | b-2-2 | (D-4-6) · ClO₄ | 50/50 | 70 | 73 | 19.5/19.2 | 5.7 |
| 75 | 85 | Q9 | D-2-2 | (D-4-6) · ClO₄ | 65/35 | 69 | 71 | 18.0/17.5 | 6.0 |
| 76 | 85 | Q9 | D-2-2 | (D-4-6) · ClO₄ | 75/25 | 68 | 70 | 19.0/16.8 | 6.1 |
| 77 | 87 | Q9 | D-2-5 | (D-4-1) · BF₄ | 50/50 | 70 | 70 | 22.0/20.0 | 5.8 |
| 78 | 87 | Q9 | D-2-5 | (D-4-1) · BF₄ | 65/35 | 68 | 70 | 21.0/19.5 | 5.9 |
| 79 | 107 | Q9 | D-4-6 | (D-3-5) · ClO₄ | 50/50 | 68 | 73 | 17.2/17.0 | 6.0 |
| 80 | 107 | Q9 | D-4-6 | (D-3-5) · ClO₄ | 65/35 | 68 | 70 | 18.0/19.0 | 6.2 |

It is evident from Table 14 that all the samples are optical recording discs exhibiting satisfactory characteristics complying with the Orange Book Standard.

Example 9

Disc samples, Nos. 91 to 94 were prepared as in Example 7 except that the recording layer was formed using a 1.0 wt % 2,2,3,3-tetrafluoropropanol solution containing a photo-stabilized cyanine dye according to the invention and a cyanine dye in a combination and weight ratio as shown below. They were examined for write/read characteristics as in Example 7, finding satisfactory characteristics as in Example 7.

| Sample No. | | |
|---|---|---|
| 91 | Compound No. 87/Compound No. 110/(D-4-6) · ClO₄ = | 60/10/30 (weight ratio) |
| 92 | Compound No. 85/(D-4-6) · ClO₄/(D-10-4) ClO₄ = | 60/35/5 (weight ratio) |
| 93 | Compound No. 94/(D-4-6) · BF₄/(D-9-5) ClO₄ = | 50/40/10 (weight ratio) |
| 94 | Compound No. 94/(D-4-6) · ClO₄/(D-9-5) ClO₄ = | 65/35/10 (weight ratio) |

Example 10

Disc samples were prepared as in Example 9 except that a reflective film of silver was used instead of the reflective film of gold. They were examined for write/read characteristics as in Example 7, finding satisfactory characteristics as in Example 8.

INDUSTRIAL APPLICABILITY

According to the invention, there are provided dyes which are highly resistant to light and soluble in solvents having a very high evaporation rate such as 2,2,3,3-tetrafluoropropanol (TFP) so that coated films can be briefly formed. Also, optical recording media having improved light resistance and write/read characteristics are obtained.

What is claimed is:

1. A photo-stabilized cyanine dye, comprising a counter ion bonded compound of a substituted benzenedithiol metal complex anion of the formula (I) and a cyanine dye cation of the formula (II):

(1)

$$\left[ R_{01}-O_2S \underset{S}{\overset{S}{\diagdown}} M \underset{S}{\overset{S}{\diagup}} SO_2-R_{02} \right]^-$$

(2)

[cyanine dye structure with $Z_1$, $Z_2$ fused rings, $CH_3$ groups, $N^+$-$R_{21}$, N-$R_{22}$, and $(CH=CH)_n$-CH bridge]

wherein $R_{01}$ and $R_{02}$ are each independently:

$$-N\overset{R_{11}}{\underset{R_{12}}{\diagdown}},$$

wherein each of $R_{11}$ and $R_{12}$ is alkyl of 1 to 4 carbon atoms or optionally substituted phenyl;

$$-N\!\!\underbrace{\phantom{XX}}_{}\!(CH_2)_m,$$

wherein m is equal 3, 4, 5 or 6;

$$-N\!\!\underbrace{\phantom{XX}}_{}\!O,$$

or an optionally substituted phenyl;

M is a transition metal;

each of $Z_1$ and $Z_2$ is a fused benzene ring or fused naphthalene ring; each of $R_{21}$ and $R_{22}$ is alkyl; and n is equal to 0, 1 or 2.

2. The photo-stabilized cyanine dye of claim 1, wherein $R_{01}$ and $R_{02}$ are each independently $$-N\overset{R_{11}}{\underset{R_{12}}{\diagdown}}$$

3. The photo-stabilized cyanine dye of claim 1, wherein $R_{21}$ and $R_{22}$ are each ethyl, ethyl or propyl.

4. The photo-stabilized cyanine dye of Claim 1, wherein $R_{01}$ and $R_{02}$ are selected from the group consisting of —N(C$_2$H$_5$)$_2$,   —N(piperidine),   —phenyl, —N(C$_4$H$_9$)$_2$,   —N(C$_3$H$_7$)$_2$,   —(tolyl with CH$_3$), —N(phenyl-CH$_3$)$_2$,   —(chlorophenyl), —N(phenyl-CH$_3$)$_2$,   —N(dinaphthyl), —N(CH$_2$)$_3$CH$_2$ (cyclic),   —N(CH$_3$)$_2$,   and   —N(morpholine)O.

5. The optical recording medium of claim 1, wherein said transition metal M is selected from the group consisting of Fe, Co, Ni, Cu and Pt.

6. The optical recording medium of claim 5, wherein said transition metal M is Cu.

7. A solution, comprising:
   a) the photo-stabilized cyanine dye of claim 1, and
   b) a solvent for said photo-stabilized cyanine dye, said solvent having an evaporation rate which is sufficiently high to reduce spin coating time.

8. The solutoin of claim 7, wherein said solvent is 2,2,3,3-tetrafluoropropanol.

9. An optical recording medium, comprising a recording layer containing a counter ion bonded compound of a substituted benzenedithiol metal complex anion of the formula (1) and a cyanine dye cation of the formula (2):

(1)

$$\left[ R_{01}-O_2S \underset{S}{\overset{S}{\diagdown}} M \underset{S}{\overset{S}{\diagup}} SO_2-R_{02} \right]^-$$

(2)

[cyanine dye structure with $Z_1$, $Z_2$ fused rings, $CH_3$ groups, $N^+$-$R_{21}$, N-$R_{22}$, and $(CH=CH)_n$-CH bridge]

wherein $R_{01}$ and $R_{02}$ are each independently:

$$-N\overset{R_{11}}{\underset{R_{12}}{\diagdown}},$$

wherein each of $R_{11}$ and $R_{12}$ is alkyl of 1 to 4 carbon atoms or optionally substituted phenyl;

$$-N\!\!\underbrace{\phantom{XX}}_{}\!(CH_2)_m,$$

wherein m is equal to 3, 4, 5 or 6;

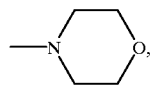

or an optionally substituted phenyl;

each of $Z_1$ and $Z_2$ is a fused benzene ring or a fused naphthalene ring;

each of $R_{21}$ and $R_{22}$ is alkyl;

and n is equal to 0, 1 or 2;

and M is a transition metal.

10. The optical recording medium of claim 9, wherein said recording layer is formed by coating a solution using a solvent having a vapor pressure of at least 5.3 Torr at 25° C.

11. The optical recording medium of claim 9, wherein said recording layer further contains at least one other dye.

12. An optical recording, comprising a substrate having a recording layer thereon, wherein a counter ion bonded compound contained in the recording layer is a salt of a substituted benzene dithiol metal complex of the formula (1) and a cyanine dye cation of the formula (3):

(1)

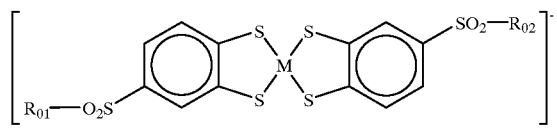

(3)

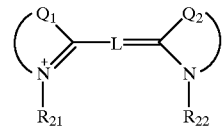

wherein $R_{O1}$ and $R_{O2}$ are each independently:

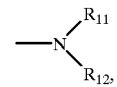

wherein each of $R_{11}$ and $R_{12}$ is alkyl of 1 to 4 carbon atoms or optionally substituted phenyl;

wherein m is equal 3, 4, 5 or 6;

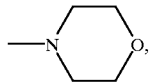

or an optionally substituted phenyl;

M is a transition metal;

wherein each of $Q_1$ and $Q_2$ is a group of atoms for forming a 5-membered nitrogenous heterocyclic ring which is optionally fused, each of $R_{21}$ and $R_{22}$ is alkyl, and L is a methine chain for completing the cyanine dye.

* * * * *